United States Patent [19]

Saegusa et al.

[11] Patent Number: 5,697,004
[45] Date of Patent: Dec. 9, 1997

[54] CAMERA CAPABLE OF STORING PHOTOGRAPHING DATA AND DISPLAY DEVICE CONNECTABLE THERETO

[75] Inventors: Takashi Saegusa, Kawasaki; Hidehiro Ogawa, Funabashi, both of Japan

[73] Assignee: Nikon Corporation, Tokyo, Japan

[21] Appl. No.: 344,619

[22] Filed: Nov. 17, 1994

Related U.S. Application Data

[63] Continuation of Ser. No. 107,009, Aug. 17, 1993, abandoned.

[30] Foreign Application Priority Data

Aug. 21, 1992 [JP] Japan ................... 4-222343
Sep. 9, 1992 [JP] Japan ................... 4-240471
Sep. 9, 1992 [JP] Japan ................... 4-240472

[51] Int. Cl.[6] ................. G03B 7/00; G03B 17/18; H04N 5/30
[52] U.S. Cl. ................. 396/211; 396/281; 396/311; 396/321; 348/231; 348/233
[58] Field of Search ................. 354/289.1, 289.12, 354/412, 465; 396/211, 213, 281, 287, 297, 310, 311, 321; 348/207, 222, 231, 232, 233

[56] References Cited

U.S. PATENT DOCUMENTS 5,027,214 6/1991 Fujimori ................. 358/909 X
5,036,344 7/1991 Inoue et al. ................. 354/412 X Primary Examiner—Safet Metjahic
Assistant Examiner—J. K. Han
Attorney, Agent, or Firm—Shapiro and Shapiro

[57] ABSTRACT

A camera comprises a photographing data memory for storing data determined for each photographing at the time of photographing, a setting memory for determining whether to store the photographing data or not, a remaining memory capacity discriminator for outputting a first signal when a memory area to store the photographing data is present and outputting a second signal when the memory area to store the photographing data is exhausted. When the second signal is outputted, an alarm is displayed or a release operation is inhibited. In accordance with another aspect, the camera may comprise an inhibit circuit for comparing a memory capacity necessary to store the photographing data and a film end mark with a remaining memory capacity and inhibiting the storing of the photographing data when the remaining memory capacity is smaller than the required memory capacity. In accordance with another aspect, the camera may comprise an inhibit circuit to inhibit the updating of the setting of the type of the photographing data to be stored when a film loaded in the camera is in the course of photographing.

10 Claims, 20 Drawing Sheets

FIG. 13

| STORED ITEMS SETTING INFORMATION | | | | | | | | NUMBER OF STORING BYTES/STORED ITEM | |
|---|---|---|---|---|---|---|---|---|---|
| 7 | 6 | 5 | 4 | 3 | 2 | 1 | 0 | | |
| | | | | | | | | NUMBER OF STORING BYTES | |
| | | | | 0 | | | | SHUTTER SPEED | NOT STORE |
| | | | | 1 | | | | APERTURE VALUE | STORE |
| | | | 0 | | | | | EXPOSURE MODE | NOT STORE |
| | | | 1 | | | | | PHOTOMETRY MODE | STORE |
| | | 0 | | | | | | FOCAL LENGTH OF LENS | NOT STORE |
| | | 1 | | | | | | | STORE |
| | 0 | | | | | | | EXPOSURE COMPENSATION AMOUNT | NOT STORE |
| | 1 | | | | | | | FLASHING COMPENSATION AMOUNT | STORE |
| 0 | | | | | | | | MEMORY FULL | ABLE TO STORE |
| 1 | | | | | | | | | STORING DISABLED |

FIG. 15

| STORED ITEM | AMOUNT OF INFORMATION |
|---|---|
| SHUTTER SPEED | 1 BYTE |
| APERTURE VALUE | 1 BYTE |
| EXPOSURE MODE | 4 BITS |
| PHOTOMETRY MODE | 4 BITS |
| FOCAL LENGTH OF LENS | 1 BYTE |
| EXPOSURE COMPENSATION AMOUNT | 1 BYTE |
| FLASHING COMPENSATION AMOUNT | 1 BYTE |

FIG. 14

| DATA | NUMBER OF STORING BYTES |
|---|---|
| 000 | NOT STORE |
| 001 | 1 BYTE |
| 010 | 2 BYTES |
| 011 | 3 BYTES |
| 100 | 4 BYTES |
| 101 | 5 BYTES |
| 110 | 6 BYTES |

FIG. 23

```
PHOTOGRAPHING DATA
FILM NUMBER                   : 0123
FILM SPEED                    : ISO  100
------------------------------------------------
FRAME NUMBER                  : 1
SHUTTER SPEED                 : 1/125
APERTURE VALUE                : F8
EXPOSURE MODE                 : MANUAL
PHOTOMETRY MODE               : MULTI-PATTERN PHOTOMETRY
FOCAL LENGTH OF LENS          :
EXPOSURE COMPENSATION AMOUNT  :
FLASHING COMPENSATION AMOUNT  :
```

FIG. 24

```
SETTING OF STORING MODE OF PHOTOGRAPHING DATA

THE SETTING IS DISABLED IN THE MIDDLE
     OF THE LOADED FILM
```

CAMERA CAPABLE OF STORING PHOTOGRAPHING DATA AND DISPLAY DEVICE CONNECTABLE THERETO

This is a continuation of application Ser. No. 08/107,009 filed Aug. 17, 1993, now abandoned.

BACKGROUND OF THE INVENTION

1. Field of the Invention

The present invention relates to a camera having a function to store photographing data and a display device connectable thereto.

2. Related Background Art

A camera capable of storing photographing data has been known. For example, photographing data is transferred to a so-called data pack mounted on a rear cover of a camera body and the data transferred to the data pack is displayed by a personal computer.

However, in the prior art camera, no consideration is paid to a case where a data memory area is full and can no longer store data, and it therefore lacks reliability.

In the prior art, since the memory for storing the photographing data is used in a uniform manner, there is also waste in the amount of storable photographing data.

In the prior art, since a store mode may be changed even while the photographing data is stored, there may be a case in which the photographing data is not correctly displayed.

SUMMARY OF THE INVENTION

It is a first object of the present invention to provide a camera which pays consideration to a case where the memory area is fully occupied and the photographing data can no longer be stored.

In accordance with the present invention, the camera comprises photographing data memory means, setting memory means for determining whether to store photographing data or not, remaining memory capacity determination means for outputting a first signal when a memory area to store the photographing data is present and outputting a second signal when the memory area to store the photographing data is exhausted.

When the second signal is outputted, an alarm is displayed or a release operation is inhibited. The stored setting is reset when a main switch is turned off.

In the present invention, the area for storing the photographing data is always monitored, and where the storing is no longer permitted, the alarm is issued or the release operation is inhibited so that there is no risk that the photographing data is not stored without notice to a user. The reset can be readily done and the photographing can be continued.

It is a second object of the present invention to use the memory device without waste by a storing method to use the memory most efficiently.

In order to achieve the above object, the present invention permits the efficiently use of the memory device by imparting address information of a plurality of memories to the memory device.

In accordance with the present invention, the storing and the reading of the photographing data is controlled by imparting a plurality of address information, the storing and the reading are attained by a simple operation of the addressing information.

It is a third object of the present invention to provide a camera and a display device which can correctly display the stored photographing data.

In order to achieve the above object, in accordance with the present invention, memory items of the photographing data are outputted from the camera together with the photographing data so that they are correctly displayed on the display device. The setting of the memory items is inhibited during the storing of the photographing data.

In accordance with the present invention, the memory items of the photographing data are outputted from the camera together with the photographing data, and the display device receives and displays them by referring to the memory item information. Further, since the change of the memory items in the course of the storing of the photographing data, is inhibited the photographing data can be correctly displayed.

BRIEF DESCRIPTION OF THE DRAWINGS

FIG. 13 shows memory item setting information of the present invention, FIG. 14 shows relation between bit information data and the number of memory bytes, FIG. 15 shows a relation between the memory item and the information amount, FIG. 23 shows a display of image data by a display device of the present invention, FIG. 24 shows a message to inhibit the modification of memory item of the photographing data in the present invention.

DETAILED DESCRIPTION OF THE PREFERRED EMBODIMENTS

Figure 1:
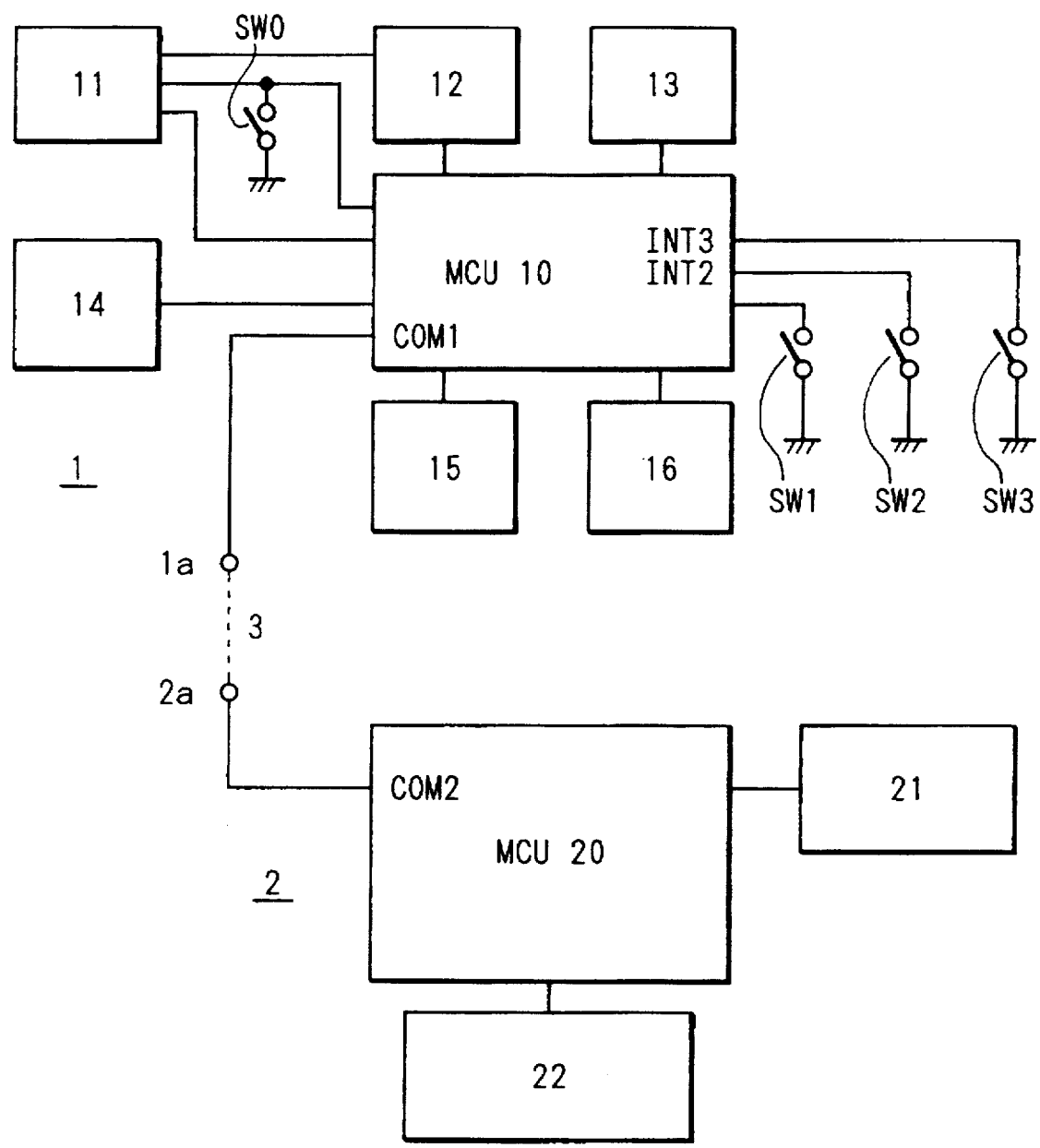
FIG. 1 shows a block diagram of a first embodiment of the present invention.
Figure 2:
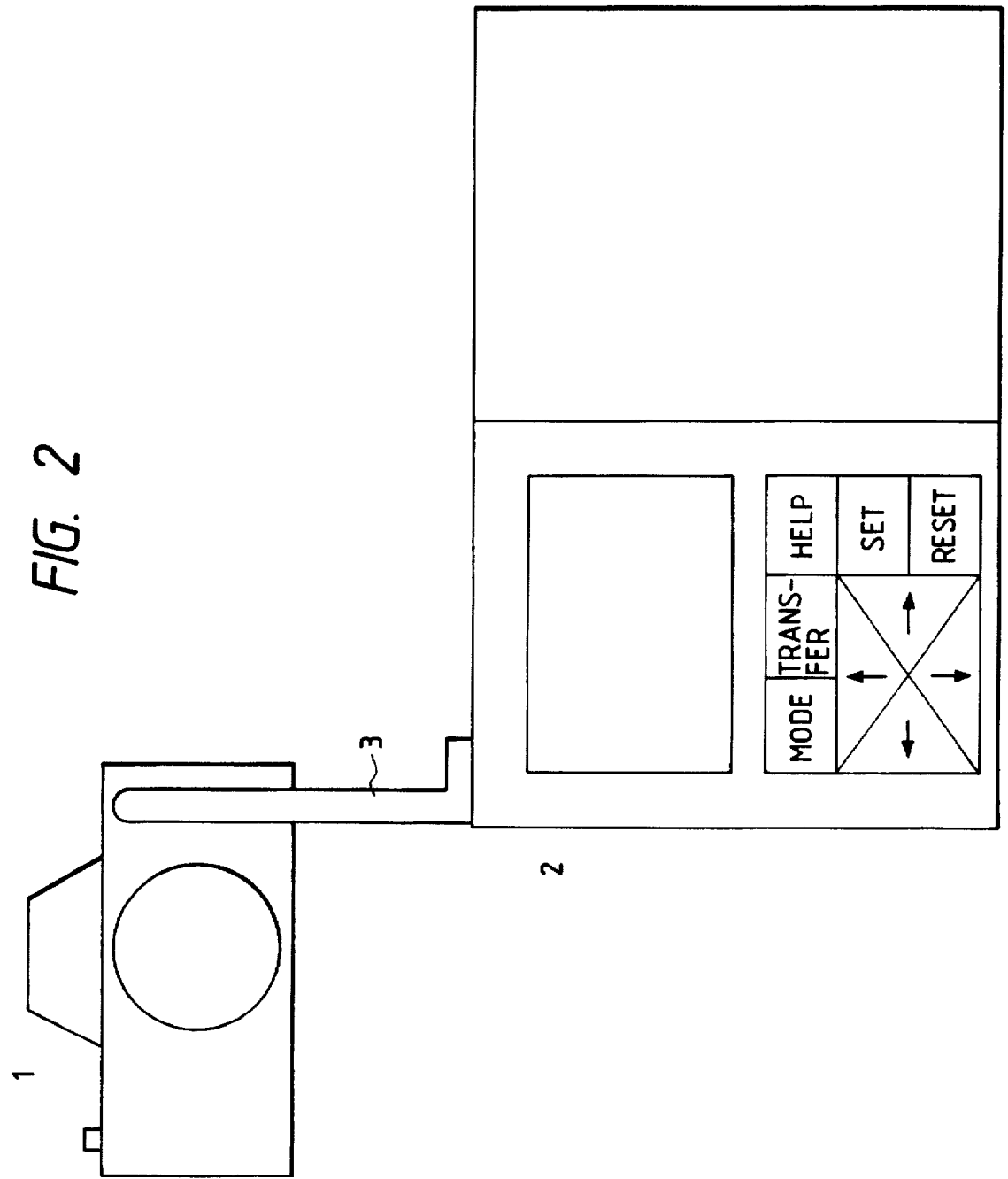
FIG. 2 shows an external view of the first embodiment of the present invention.

FIG. 1 shows a block diagram of an embodiment in accordance with a first aspect of the present invention. Numeral 1 denotes a camera main body and numeral 2 denotes an electronic organizer having a communication function and which is connectable with the main body 1 through a connecting cable 3. FIG. 2 shows an external view thereof.

The camera main body 1 comprises a main switch SW0, a release switch SW1, a film load/unload switch SW2, a rewind switch SW3, a microcomputer (hereinafter MCU) 10, a power supply control circuit 11, a setting member 12, a photometering circuit 13, a non-volatile memory circuit 14, a display device 15 and an interface circuit 16.

When the setting member 12 for setting an exposure mode or an exposure condition is manipulated while SWO is in an ON state, the power supply control circuit 11 supplies a power to the entire circuit. Once the power is turned on, the power is held by an output of the MCU 10. The non-volatile memory circuit 14 is a known EEPROM (which has 256 addresses in the present embodiment). Once it stores data, it holds the memory even after the power is turned off so that the stored data can be read when the power is again turned on. The interface circuit permits diaphragm control, shutter control and motor control by outputs from the MCU 10.

The MCU 10 has a serial communication port COM 1 which is connectable with a communication port 1a of an electronic organizer.

The film load/unload switch SW2 is turned on when a rear cover is closed while a film is loaded. It is connected to an interrupt input terminal INT 2 of the MCU 10 so that an interrupt signal is supplied to the MCU 10 when SW2 is turned on.

The rewind switch SW3 is turned on by the manipulation of a rewind member. It is connected to an interrupt input terminal INT 3 of the MCU 10 so that an interrupt signal is supplied to the MCU 10 when SW# is turned on.

The electronic organizer 2 comprises a microcomputer (hereinafter MCU) 20, a display device 21 and a setting member 22. The MCU 20 has a serial communication port COM 2 which is connected to a contact 2a of the main body.

The main body 1 and the electronic organizer 2 are connected by the communication terminals 1a and 2a through a cable 3.

Table 1 shows an address map of the EEPROM 15 and a RAM of the MCU 10. The addresses up to #63 of the EEPROM 14 and the RAM are common, but the addresses after #64 where the photographing data is actually stored are not common.

The address #0 stores a preset exposure control mode, the address #1 stores a preset shutter speed, the address #2 stores a preset film sensitivity, the address #3 stores a film load/unload status and other information are serially stored. Then, setting information on the memory of the photographing data is stored.

The address #58 is for film number data. It is counted up each time a new film is loaded and the easy loading is executed.

The address #59 stores information setting whether to store the photographing data or not. When the bit 0 is "1", it means that the storing of the photographing data has been set, and when the bit 0 is "0", it means a non-setting status. The bit 7 stores information of presence or absence of the setting of an alarm operation to be described later. When the bit 7 is "0", it means a non-alarm status, and when the bit 7 is "1", it means an alarm status.

TABLE 1

| RAM | EEPROM | Data Content |
| --- | --- | --- |
| 0 | 0 | Preset exposure control mode |
| 1 | 1 | Preset shutter speed |
| 2 | 2 | Preset film sensitivity |
| 3 | 3 | Film load/unload |
| 58 | 58 | Film number |
| 59 | 59 | Data storing setting |
| 60 | 60 | Data format |
| 61 | 61 | Memory start address |
| 62 | 62 | Current film start address |
| 63 | 63 | Current address |
|  | 64 |  |
|  | 65 |  |
|  | 255 |  |

The address #60 stores bit format data which indicates a format of the stored photographing data.

The address #61 stores a memory start address. It means that the storing has been started from the data stored at the addresses starting at that address.

The address #62 stores a current film start address which indicates a next writable address each time the photographing of one film is completed.

The address #63 stores a current address which indicates an address to be written next. It is incremented each time data is written.

The addresses #64 to #255 store the actual photographing data.

Thus, when the storing of the photographing data is first set, the data "64" which indicates the address capable of storing data is written at the addresses #61 to #63.

The content of the data stored is generally classified into two types. They are data common to one film and data which is variable with the photographing of each frame. In an example shown in Table 2, a film number at the address #58 and a film sensitivity at the address #2 are stored in the easy load mode. As a result, "1" indicating a first film is written at the address #64 and the film sensitivity of the first film is written at the address #65. The photographing data of each frame varies depending on what are important items and it is determined by a data format at the address #60. In the example of Table 2, a shutter speed and a diaphragm value are stored. Accordingly, the current address data is incremented by two for each frame. When the storing of one film is completed, an end mark is stored so that a boundary of films can be identified when the stored data is read by the electronic organizer. As the end mark, data which is not used for the shutter speed, the diaphragm value, the film sensitivity and the number of photographed films is used. In the present example, data "SFF" is used.

When the photographing of the first film is completed and the end mark is stored, the current film start address at the address #63 is 139 and when the photographing of a second film is completed and an end mark is stored, it is 214.

The number of films whose data can be stored differs depending on the number of data bytes to be stored determined by the data format and the number of frames of the film. In the example of Table 2, when the storing of the data for the 20th frame of the third film is completed, the current address is 256 and no vacant data memory area is left. In the present embodiment, an alarm is issued under this condition and the release operation is inhibited.

As a result of the release inhibition, the photographing cannot be continued. Thus, the electronic organizer is connected and the photographing data is read into the electronic organizer. Since the reading is made film by film by using the end mark, it is possible to write the photographing data again at the addresses #64 to #213. The address #214 is left in order to avoid the break of one data. The electronic organizer then modifies the data relating to the address so that the main body can continue the storing of the data. Since the addresses #214 et seq are left, the memory start address at the address #61 stores 214. The current film address at the address #62 stores 214 and the current address is changed to 64 because new data can be written starting from the address #64 since the data at the addresses #64 to #213 has been taken out. In effect, therefore the end address #255 and the address #64 at which the data memory area starts are continuous.

TABLE 2

| RAM | EEPROM | Data Content |
| --- | --- | --- |
| 60 | 60 | Data format |
| 61 | 61 | Memory start address (64) |
| 62 | 62 | Current film start address (64) |
| 63 | 63 | Current address |
|  | 64 | Film number (01) |
|  | 65 | First film sensitivity |
|  | 66 | First frame shutter speed |
|  | 67 | First frame diaphragm value |
|  | 136 | 36th frame shutter speed |
|  | 137 | 36th frame diaphragm value |
|  | 138 | End mark ($FF) |
|  | 139 | Film number (02) |
|  | 140 | Second film sensitivity |
|  | 141 | First frame shutter speed |
|  | 142 | First frame diaphragm value |
|  | 211 | 36th frame shutter speed |
|  | 212 | 36th frame diaphragm value |
|  | 213 | End mark ($FF) |
|  | 214 | Film number (03) |
|  | 215 | Third film sensitivity |
|  | 216 | First frame shutter speed |
|  | 217 | First frame diaphragm value |
|  | 254 | 20th frame shutter speed |
|  | 255 | 20th frame diaphragm value |

TABLE 3

| RAM | EEPROM | Data Content |
| --- | --- | --- |
| 60 | 60 | Data format |
| 61 | 61 | Memory start address (214) |
| 62 | 62 | Current film start address (172) |
| 63 | 63 | Current address (214) |
|  | 65 | First film sensitivity |
|  | 64 | 21st frame shutter speed |
|  | 65 | 21st frame diaphragm value |
|  | 94 | 36th frame shutter speed |
|  | 95 | 36th frame diaphragm value |
|  | 96 | End mark ($FF) |
|  | 97 | Film number (04) |
|  | 98 | Fourth film sensitivity |
|  | 99 | First frame shutter speed |
|  | 100 | First frame diaphragm value |

TABLE 3-continued

| RAM | EEPROM | Data Content |
| --- | --- | --- |
|  | 169 | 36th frame shutter speed |
|  | 170 | 36th frame diaphragm value |
|  | 171 | End mark ($FF) |
|  | 172 | Film number (05) |
|  | 173 | Fifth film sensitivity |
|  | 174 | First frame shutter speed |
|  | 175 | First frame diaphragm value |
|  | 212 | 20th frame shutter speed |
|  | 213 | 20th frame diaphragm value |
|  | 214 | Film number (03) |
|  | 215 | Third film sensitivity |
|  | 216 | First frame shutter speed |
|  | 217 | First frame diaphragm value |
|  | 254 | 20th frame shutter speed |
|  | 255 | 20th frame diaphragm value |

As the storing of the data is again continued in accordance with the above format, the current address reaches the memory start address when the storing of the 20th frame of the third film is completed and no memory area is left as shown in Table 3. Then, the following alarm status is started.

Figure 3:
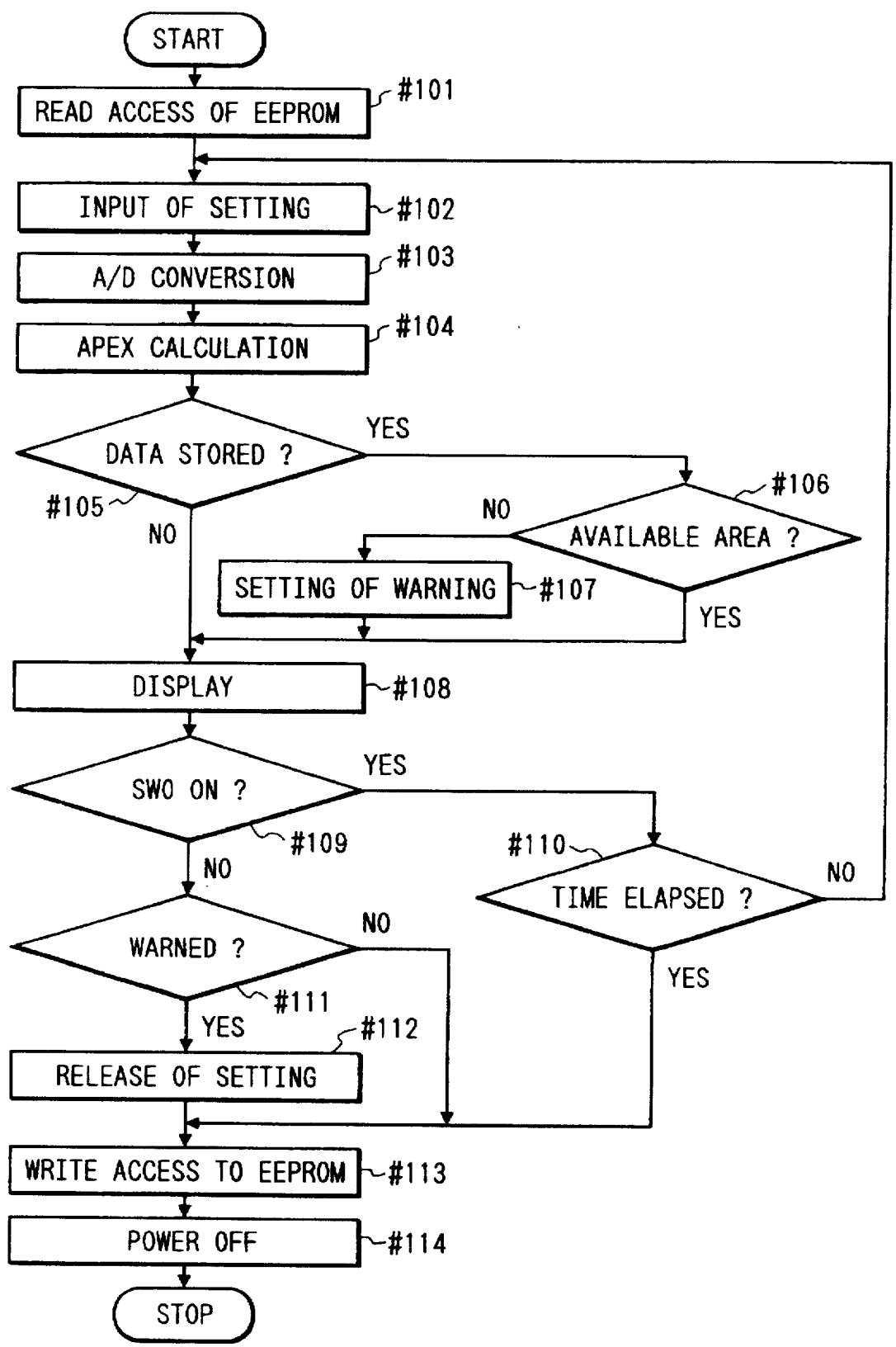
FIG. 3 shows a flow chart of a main routine of an MCU 10.

FIG. 3 shows a flow chart of a main routine of the MCU 10. When the setting member 12 is manipulated while the main switch SW0 is in an ON state, the power supply control circuit 11 supplies a power to the entire circuit and an operation of the MCU 10 is started.

In a step #101, the EEPROM 14 is read and it is transferred to the RAM of the MCU 10. Namely, settings of the camera, adjustment values and settings of special functions are set into the RAM.

In a step #102, the settings of the exposure control mode, the shutter speed, the diaphragm value and the film sensitivity are modified in accordance with the information from the setting member 12 and they are stored at predetermined addresses as shown in Table 1. In a step #103, an output of the photometering circuit 13 is A/D converted. In a step #104, an apex operation is carried out based on the preset inputs, the photometering output and an operation result of stepwise exposure.

In a step #105, the presence or absence of the data memory setting at the address #59 is checked. If the bit 0 is "1" indicating that the data memory setting has been made, the process proceeds to a step #106, and if the bit 0 is "0" indicating that the data memory setting has not been made, the process proceeds to a step #108.

In the step #106, the current address at the address #63 is compared with the memory start address at the address #61 and the end address, and if there is a vacant area to store data, the process proceeds to a step #108, and if there is no vacant area, the process proceeds to a step #107.

In the step #107, the bit 7 at the address #59 is set to "1" to set a data memory alarm flag.

Figures 7, 8A, 8B:
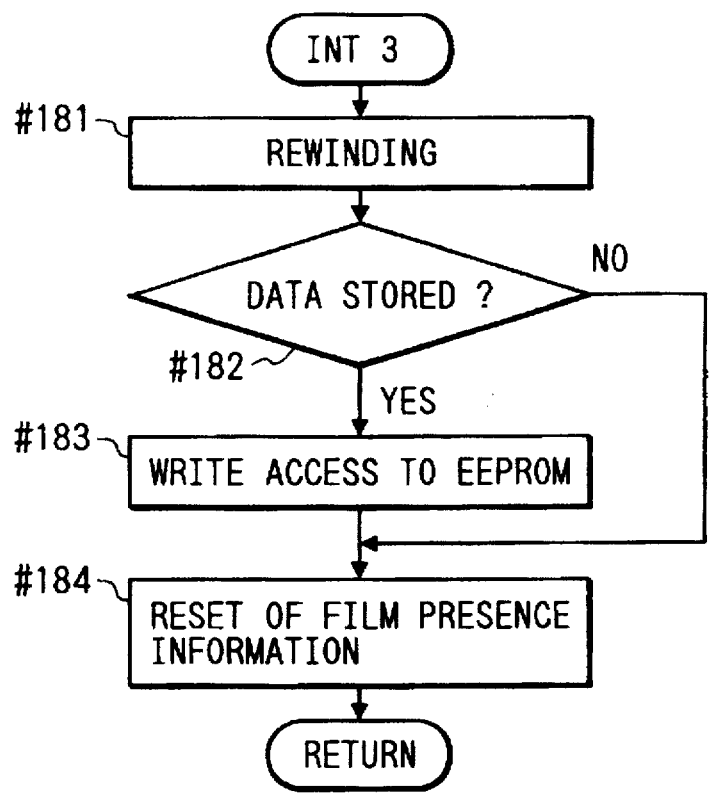
FIG. 7 shows a flow chart of an interrupt routine of an interrupt input terminal INT 3 of the MCU 10.
FIGS. 8A and 8B show a display of a display device 15 of a main body 1.

In the step #108, the display device 15 is activated to display an operation result as shown in FIG. 8A. If the data memory alarm has been set in the step #107, the alarm status is indicated by "FULL" as shown in FIG. 8B.

In a step #109, the ON/OFF state of the main switch SW0 is checked. If it is ON, the process proceeds to a step #110, and if it is OFF, the process proceeds to a step #111.

In the step #110, it is judged whether a predetermined time has elapsed since the setting member 12 was lastly manipulated or not, and if the predetermined time has elapsed, the process proceeds to a step #113 to turn off the power supply, and if the predetermined time has not elapsed, the process returns to the step #102 to repeat the process.

In a step #111, the data memory setting information at the address #59 is checked to determine if the bit 7 is "1" indicating the data memory alarm status or not. If the bit 7 is "0", the process proceeds to the step #113, and if the bit 7 is "1" indicating the alarm status, the process proceeds to a step #112. In the step #112, the data memory setting information at the address #59 is cleared to release the data memory setting and the alarm status. The photographing data at the addresses #60 et seq and the data to recover it are not cleared. The process proceeds to the step #112 when the main switch is turned off while the data memory vacant area set by the electronic organizer is exhausted. In the present embodiment, the electronic organizer may be connected to the camera through the cable 3 to reset the settings by the electronic organizer. If it is troublesome to connect the cable 3, the main switch may be turned off to reset the settings of the data memory.

On the other hand, the reset of the settings in the step #112 by the turn-off of the main switch may be troublesome to a user whose preference is to conduct further photography with data storage after having taken the data from the memory into the electronic organizer. In such a case, the main switch may be left on and the turn-off by the elapse of time to proceed from the step #110 to the step #113 may be selected.

In the step #113, data is written into the EEPROM 14. It is a reverse operation to that of the step #101. Namely, those data from the address #0 to the address #63 of the RAM of the MCU 10 which were modified are stored into the corresponding addresses of the EEPROM. If the data memory settings have been cleared in the step #112, "0" is written into the corresponding address (#59). Where the process proceeded from the step #110 to the step #113 by the elapse of the predetermined time or the process proceeded from the step #111 to the step #113 in the non-alarm status the data from the address #58 to the address #63 is stored as it is.

In a step #114, a power-off signal is transmitted to the power supply control circuit 11 to stop the operation.

Figure 4:
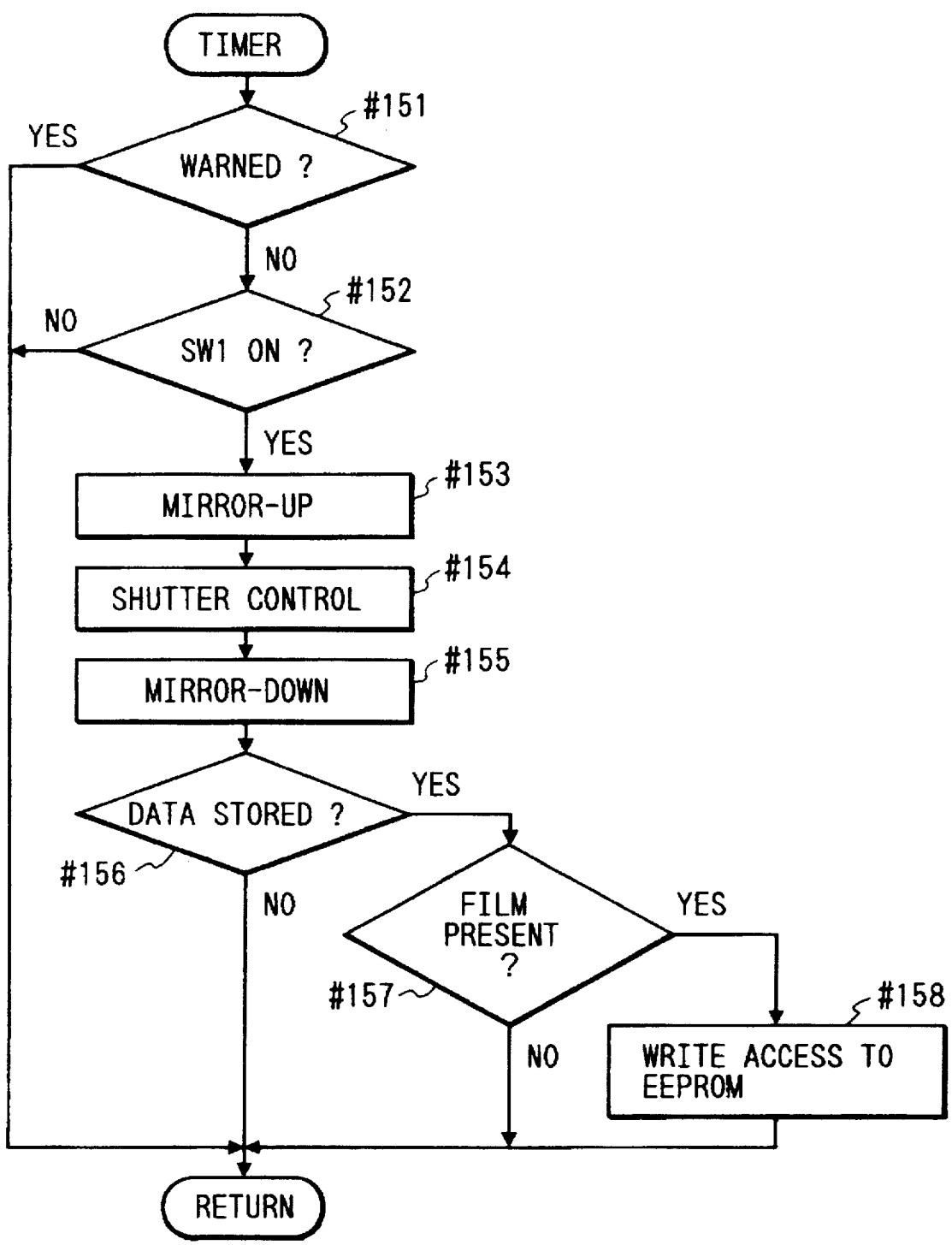
FIG. 4 shows a flow chart of a timer interrupt routine of the MCU 10.

FIG. 4 shows a flow chart of the timer interrupt routine of the MCU 10. The process of FIG. 3 is switched to the process of FIG. 4 at a predetermined interval (for example, 1 ms). In a step #151, the presence or absence of the data memory alarm is determined, and if the alarm status is not detected, the process proceeds to a step #152 and if the alarm status is detected, the process returns to resume the previous process of FIG. 3.

In a step #152, the ON/OFF status of the release switch SW1 is determined. If it is ON, the process proceeds to a step #153, and if it is OFF, the process returns to resume the previous process of FIG. 3.

In a step #153, the interface circuit 16 is activated to carry out a mirror-up operation, and the circuit 16 is activated to carry out the shutter control in a step #154 based on the operation result in the step #104, and a mirror-down operation is carried out in a step #155.

In a step #156, the presence or absence of the data memory setting is checked. If the setting has been made and the bit 0 at the address #59 is "1", the process proceeds to a step #157, and otherwise the process returns.

In a step #157, the load/unload status of the film is checked. If the film has been loaded by the easy load operation and the bit 0 of the film load/unload information at the address #3 is "1", the process proceeds to a step #158, and otherwise the process returns.

In a step #158, data is directly written into the EEPROM in accordance with the data format at the address #60, and the current address at the address #63 is incremented by the amount of data written by the photographing data. As shown in Tables 2 and 3, where the shutter speed and the diaphragm value based on the operation result of the step #104 are written, the current address is incremented by two. When the writing to the EEPROM is completed, the process returns. The writing is made only when the data memory has been set and the film has been loaded because it is of no sense to store the data which is not actual photographing data.

Figure 5:
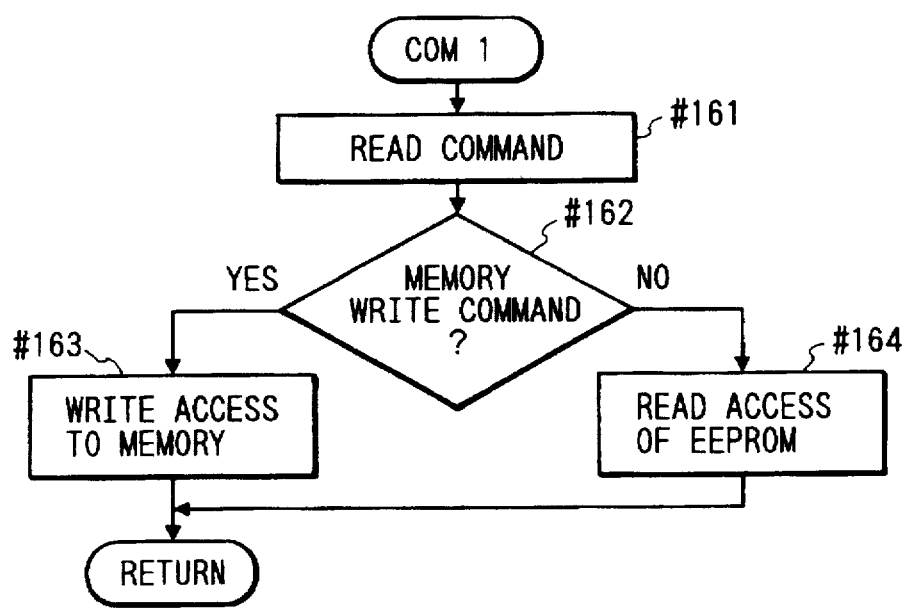
FIG. 5 shows a flow chart of a serial interrupt routine of the MCU 10.

FIG. 5 shows a flow chart of a serial interrupt routine of the MCU 10 which is started by the interrupt to the MCU 10 when the communication is started from the electronic organizer 2 to the serial communication port COM 1.

In a step #161, a command from the electronic organizer is read. In a step #162, the command is decoded. If it is a memory write command, the process proceeds to a step #163, and otherwise the process proceeds to a step #164.

In the step #163, a control corresponding to the memory write command of the electronic organizer 2 is made. Namely, data at an address designated by the transferred data is replaced by the subsequently transferred data. For example, when 1 (00000001) is written into the address #59 by the data from the electronic organizer, the bit 0 is changed to "1" to make the data write setting. Since the bit 7 is changed to "0", the data memory alarm is reset. The MCU 10 may know a new memory area by the writing at the addresses #60, #61 and #62, as explained in Tables 2 and 3.

In a step #164, a response to correspond to the EEPROM read command of the electronic organizer is made. Namely, the data at the address of the EEPROM designated by the transferred data is transferred to the electronic organizer 2. The electronic organizer 2 may prepare a data file for each film from the photographing data at the addresses #64 to #255 based on the data at the addresses #60 to #63.

When the process of the steps #165, #166 or #167 is completed, the process returns and continues the process prior to the interruption.

Figure 6:
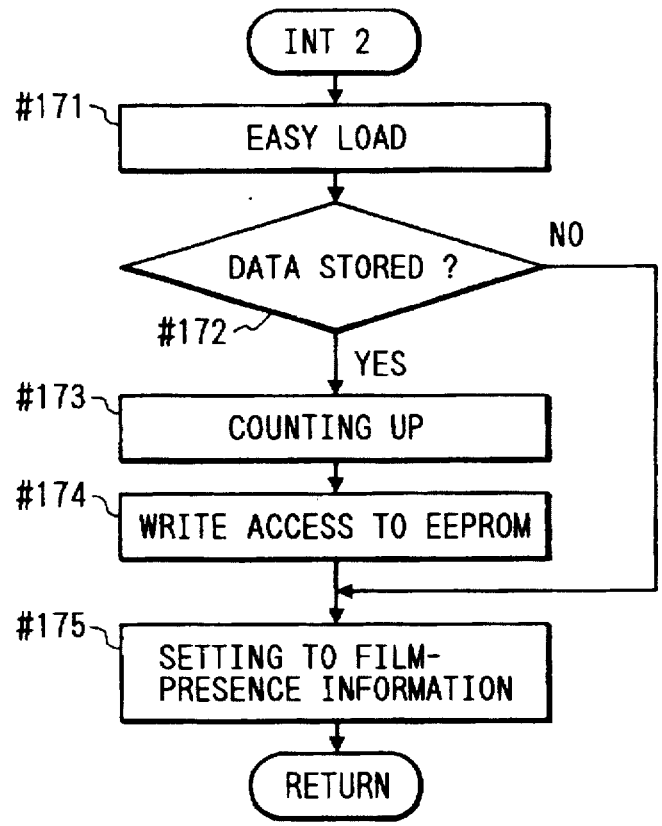
FIG. 6 shows a flow chart of an interrupt routine of an interrupt input terminal INT 2 of the MCU 10.

FIG. 6 shows a flow chart of the interrupt routine of the interrupt input terminal INT 2 of the MCU 10. The interrupt input terminal INT 2 is connected to the film load/unload switch SW2 which is turned on when the rear cover is closed while the film is loaded, and the MCU 10 is switched to the process of FIG. 6 at the fall of the terminal INT 2 by the turn-on of SW2.

In a step #171, the circuit 16 is controlled to drive a motor to control the easy load. Namely, when the film is loaded and the rear cover is closed, a film counter is set to "1" by wind-up operation of a predetermined amount.

In a step #172, the data memory setting information is checked, and if the data memory has been set, the process proceeds to a step #173, and if the data memory has not been set, the process proceeds to a step #175.

In the step #173, the film number at the address #58 is incremented. This data is used for the identification of the film. In a step #174, the film number and the film sensitivity data which are unique to each film are written into the EEPROM. Namely, the film number at the address #58 is written into the EEPROM at the address designated by the current address at the address #63, and the current address is incremented by one. The film sensitivity at the address #2 is written into the next address of the EEPROM.

In a step #175, regardless of the presence or absence of the data memory setting, the bit 0 of the film load/unload information is set to "1" to indicate the load status of the film since the easy load has been completed, and the interruption of the INT 2 is inhibited and the interruption of the INT 3 is enabled. Once the interruption is inhibited, the process of FIG. 6 is not executed until the rewinding is completed. On the other hand, the rewinding may be executed any time.

FIG. 7 shows a flow chart of the interrupt routine of the interrupt input terminal INT 3 of the MCU 10. The interrupt input terminal INT 3 is connected to the rewind switch SW3 which is turned on by the manipulation in the rewind operation, and the process is switched to the process of FIG. 7 at the fall of the terminal INT 3 by the turn-on of SW3.

In a step #181, the circuit 16 is controlled to drive the motor so that the motor is controlled to rewind the film until the film load/unload SW is turned off.

In a step #182, the data memory information is checked. If the data memory has been set, the process proceeds to a step #183, and if the data memory has not been set, the process proceeds to a step #184.

In the step #183, an end mark indicating the completion of the storing of the data of one film is written into the EEPROM. Namely, the data "SFF" is written into the EEPROM at address designated by the current address at the address #63, and the current address is incremented by one. When the rewinding is completed, the current address data is also written into the current film start address at the address #62.

Regardless of the presence or absence of the data memory setting, in the step #184, the film load/unload information at the address #3 is set to the unload status since the rewinding has been completed, and the interruption of the INT 3 is inhibited and the interruption of the INT 2 is enabled. Once the interruption is inhibited, the process of FIG. 7 is not executed until the easy load is completed. On the other hand, the easy load may be executed any time.

Figure 9:
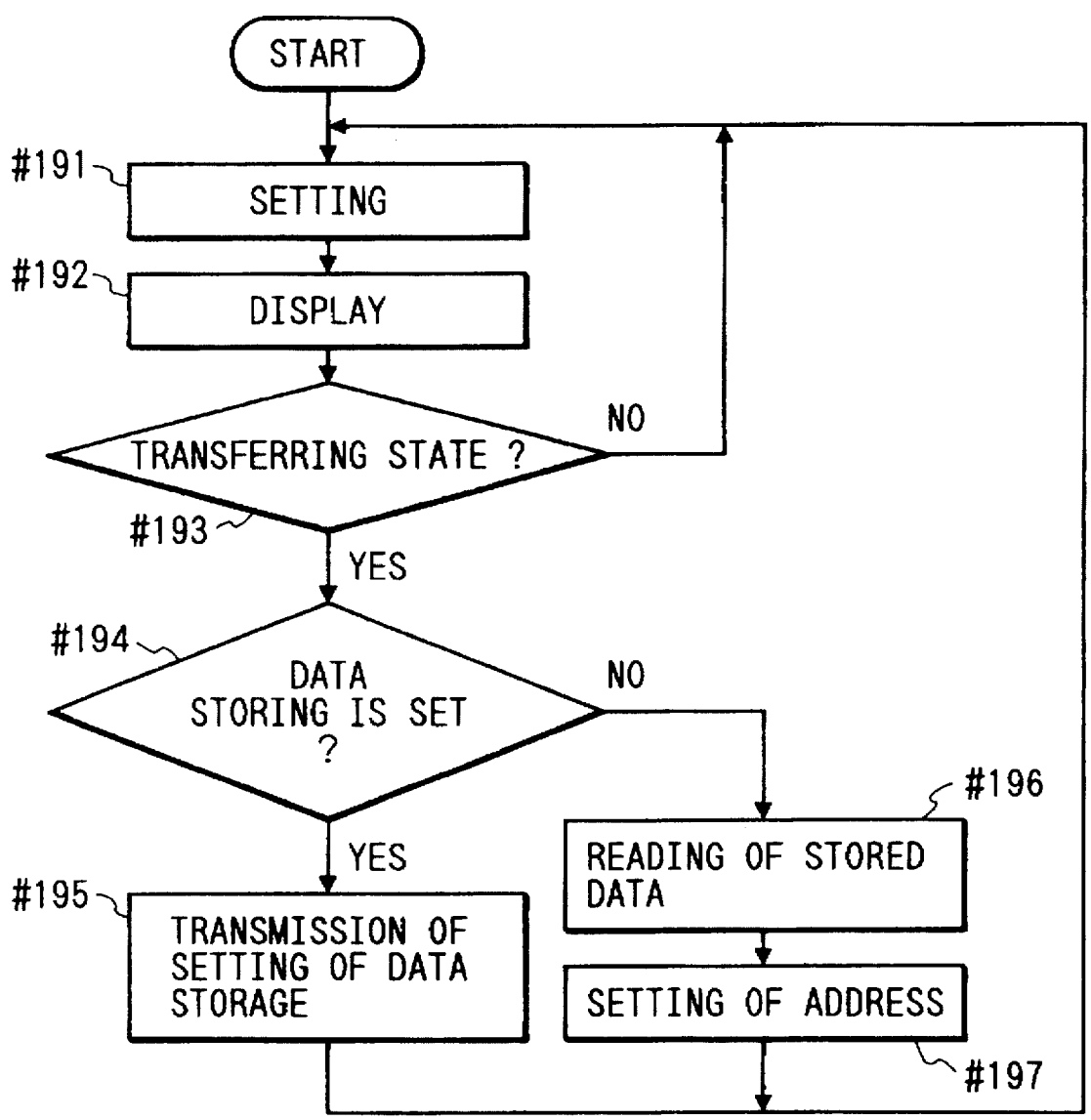
FIG. 9 shows a flow chart of a main routine of an MCU 20 of an electronic organizer 2.

FIG. 9 shows a flow chart of a main routine of the MCU 20 of the electronic organizer.

Figures 10A, 10B, 10C:
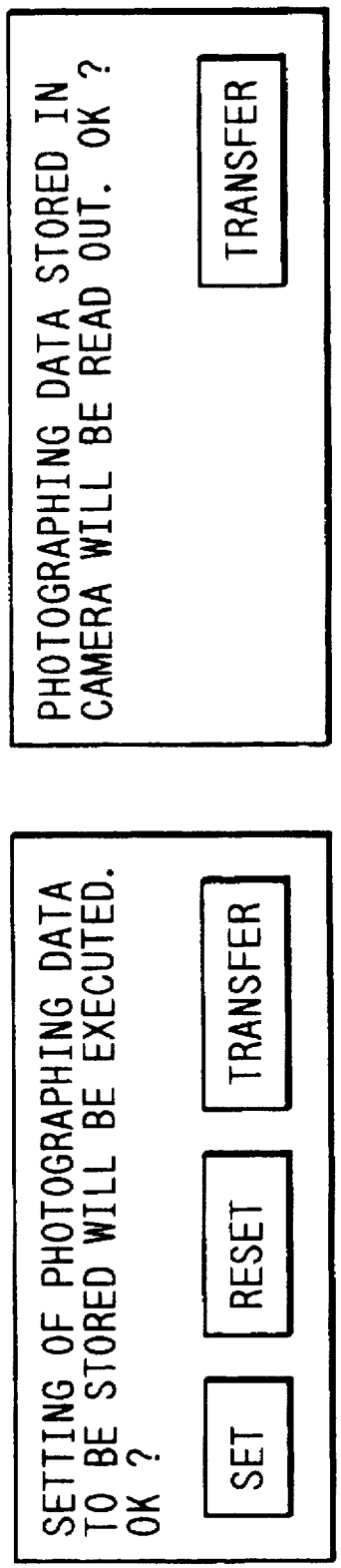
FIGS. 10A to 10C show a display of a display device 21 of the electronic organizer.

In a step #191, settings are made in accordance with the status of the setting member 22. Setting is selected by an arrow key of the setting member 22 and the set, reset or transfer to the main body is commanded by a set key, a reset key or a transfer key. It is assumed that settings of "data memory setting", "memory data readout" and "memory data display" may be made. In a step #192, the display device 21 is activated to display data in accordance with the setting data. An example of display is shown in FIGS. 10A to 10C. FIG. 10A shows a "data memory" set/reset screen, FIG. 10B shows a "data readout" setting screen, and FIG. 10C shows a "memory data display" screen.

In a step #193, whether the mode is to transfer (communicate) data to the camera main body or not is determined. If the transfer key has been manipulated in the screen of FIG. 10A or FIG. 10B, the process proceeds to a step #194, and if the transfer key has not been manipulated as shown in FIG. 10C, the process returns to the step #191 and the process is repeated in the MCU 20.

If the transfer key has been manipulated, whether the data memory setting status has been set or not is determined in a step #194, and if the data memory setting status has been set, the process proceeds to a step #195, and if the memory data read has been set, the process proceeds to a step #196.

In the step #195, the memory write to the main body is carried out through the serial communication port COM 2 and the data memory setting is transferred to the MCU 10. The memory write means to designate the address of the RAM of the MCU 10 and replace the data of that address by the subsequently transferred data. The MCU 10 of the main body responses in the step #163 to update the data of the designated address in accordance with the setting. When "1" is written into the address #59, the bit 0 is changed to "1" so that the data write is set. By writing at the addresses #60, #61 and #62, a new memory area as explained in Tables 2 and 3 may be set into the MCU 10. On the other hand, if "0" is written into the address "59", the memory setting of the photographing data is reset. In the step #196, a read command for the EEPROM is sent to the main body through the serial communication port COM 2. The MCU 10 of the main body transfers the data at the address of the EEPROM designated in the step #164 to the MCU 20. As a result, the MCU 20 may prepare a data file for each film from the photographing data at the addresses #64 to #255 based on the data at the addresses #60 to #63. A new memory start address may be attained from the data of the current film address at the address #62.

In a step #197, the memory write is carried out as it is in the step #195 to set the memory address. The memory start address at the address #61 is updated by the current film start address at the address #62 so that a new memory area may be set in the MCU 10 as explained by the Tables 2 and 3. "1" is written into the data memory setting information at the address #59 so that the bit 7 is changed to "0" and the data memory alarm of the MCU 10 is reset. After the step #195 or the step #197, the process returns to the step #191 and the above process is repeated.

An operation of the main body when the data memory setting is not present is now explained.

In the absence of the data memory, the flow of FIG. 3 proceeds from the step #105 to the step #108 and the alarm display as shown in FIG. 8B due to the exhaustion of the data memory area is not set. In the easy load, the flow of FIG. 6 jumps from the step #172 to the step #175 so that the increment of the film number in the step #173 and the writing of the film sensitivity in the step #174 are not carried out. In photographing after the easy load, the flow of FIG. 4 returns from the step #156 so that the writing of the photographing data is not carried out. In the rewinding, the flow of FIG. 7 jumps from the step #182 to the step #184 so that the writing of the end mark is not carried out.

The memory setting of the photographing data is now explained. When the electronic organizer 2 is connected to the main body 1 through the cable 3, the MCU 10 and the MCU 20 can communicate through the communication terminals COM 1 and COM 2, respectively.

It is assumed that the display device 21 displays the status shown in FIG. 10A by the key operation of the setting member 22 of the electronic organizer. Before the transfer key is manipulated, the flow of FIG. 9 proceeds the steps #191–⌒192–#193 and returns to the step #191. When the transfer key is manipulated, the process proceeds from the step ⌒193 to the step #194 for determination. Since it is the data memory setting screen, the process proceeds to the step #195 and sends the memory write command to the MCU by through the COM 2. Thus, the interruption by the COM 1 acts on the MCU 10 so that the process of FIG. 5 is executed. When a response is made to the memory write command in the steps #161–#162–#163, the data necessary for the data memory at the addresses #59 to #63 of Table 1 is set in the RAM of the MCU 10. After the step #195, the process returns to the step #191 and the cable 3 may be disconnected until the photographing data is read out. The writing to the addresses #59 to #63 of the EEPROM is executed in the step #113 of FIG. 3. In the step #113, the modified content of the RAM at the addresses #0 to #63 is transferred to the EEPROM and stored therein. In a step #114, the power supply is turned off. If the setting member is manipulated while the main switch SW0 is ON, the power supply is again turned on by the power supply control circuit 11 so that the MCU 10 reads the data stored in the EEPROM by the operation of the step #101 and the same operation as that prior to the turn-off of the power supply including the storing of the photographing data is attained.

An operation of the main body when the data memory setting is made is now explained.

When the data memory is set, the flow of FIG. 3 proceeds from the step #105 to the step #106 but it does not proceed to the step #107 so long as there is a vacant area to store the data, and the alarm status is not set. Accordingly, in the step #108, normal exposure display is made by the display device 15 as shown in FIG. 8A.

In the easy load, the flow of FIG. 6 proceeds from the step #172 to the step #173 to increment the film number, and then to the step #174 to write the film number and the film sensitivity. In photographing after the easy load, the flow of FIG. 4 proceeds to the steps #156–#157–#158 to write the photographing data. When the rewinding is carried out, the flow of FIG. 7 proceeds from the step #182 to the step #183 to write the end mark. When the release operation is carried out without loading the film, the flow of FIG. 4 returns from the step #157 and the photographing data is not written.

If the main switch SW0 is turned off during this process, the process proceeds from the step #109 to the step #111 but since the alarm status is not set, the process jumps to the step #113. When the setting member is not manipulated for a predetermined time period even if the main switch is not turned on, the process jumps from the step #110 to the step #113. In the step #113, the updated RAM content from the address #0 to the address #63 is transferred to the EEPROM and stored therein. In the step #114, the power supply is turned off.

In this manner, the photographing data is written and the current address data reaches the end address (#255). When the current address exceeds the end address and the memory start address, the EEPROM is in the FULL state in which there is no vacant are to store the data. Referring to Table 3, the current address in Table 3 already exceeds the end address (#255). The current address further reaches the memory start address (#214) of the third film and it is in the FULL state in which the data can no longer be stored.

In the FULL state, the flow of FIG. 3 proceeds from the step #106 to the step #107 so that the bit 7 of the data memory information at the address #59 is set to "1" to set the alarm status. Thus, the alarm is displayed by the display device 15 as shown in FIG. 8B in the step #108. Since the flow of FIG. 4 now returns from the step #151, the release operation, even if it is carried out, is invalidated and the release operation is inhibited.

Under this condition, if the main switch SW0 is turned off, the process proceeds to the steps #109–#111–#112 since the data memory alarm has been set, and the address #59 is cleared to reset the data memory setting. On the other hand, if the main switch is not turned off and the setting member 12 is not manipulated for a predetermined time period, the process jumps from the step #110 to the step #113 and the setting is not reset. In the step #113, the updated content of the RAM from the address #0 to the address #63 is transferred to the EEPROM and stored therein. When the setting is reset in the step #112, the data with the reset condition is written into the EEPROM.

In the step #114, the power supply is turned off. When the power supply is again turned on and the data of the EEPROM is read and the setting is reset, it is same as the case where the setting has not been made and the release inhibition and the alarm display are also reset. That is, phototaking can be conducted in the non-data-storing mode even though the EEPROM is FULL (insufficient memory area remaining). On the other hand, if the setting of the step #112 is not reset, the bit 7 of the data memory setting information remains "1" and the alarm display remains and the release inhibition continues when the power is again turned on.

The stored photographing data is taken into the electronic organizer to resecure the vacant area. Like in the setting of the data memory, the electronic organizer 2 is connected to the main body 1 through the cable 3.

When the transfer key is manipulated when the display device 21 displays the "memory data readout" screen as shown in FIG. 10B by the key manipulation of the setting member 22 of the electronic organizer, the process proceeds from the step #193 to the step #194 for determination. Since it is the "memory data readout" screen, the process proceeds to the step #196 so that the MCU 20 can store the stored photographing data to a file for each film by sending the read command of the EEPROM to the MCU 10 through the COM 2. In the step #197, the write command is sent to set the memory start address at the address #61 as shown in Table 3 into the RAM of the MCU 10 and the data memory setting information at the address #59 is written to reset the alarm flag of the bit 7. The process returns to the step #191 so that the electronic organizer 2 can display the stored photographing data as shown in FIG. 10C. On the other hand, the data memory alarm of the main body 1 is reset and the vacant area has now been increased so that it is same as the case immediately after the setting of the data memory.

When the setting of the data memory is reset by turning off the main switch, the data memory setting information at the address #59 is cleared but the data at the addresses #60 et seq are held so that the electronic organizer 2 may prepare the file of the photographing data for each film when it reads the data of the EEPROM from the main body.

The vacant area is detected by the comparison of the current address at the address #63 and the memory start address at the address #61 while taking the number of photographing data by the photographing data into consideration. When the film is rewound, an area for the end mark may be secured so that it can be written.

Figure 11:
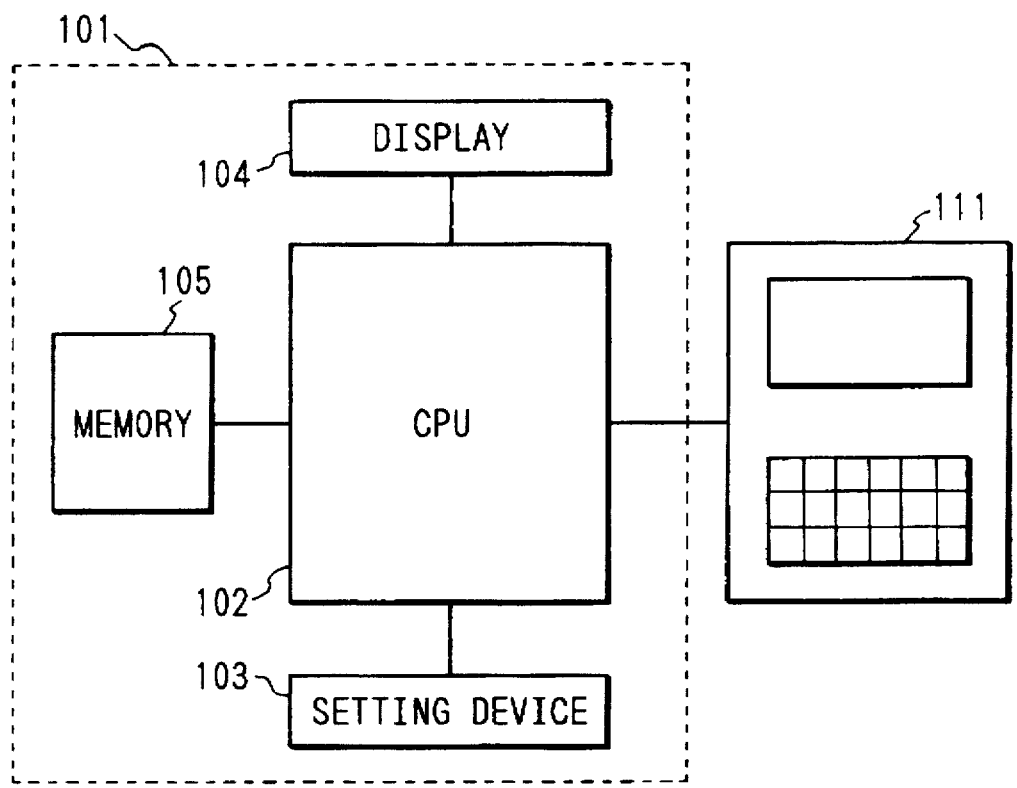
FIG. 11 shows a camera of a second embodiment of the present invention and a personal computer for setting a memory mode and reading the photographing data.

In the present embodiment, the area to store the photographing data is always monitored and if the data can no longer be stored, the alarm is displayed or the release operation is inhibited. Accordingly, non-storing status without notice to the user is prevented. Since the alarm status may be reset by turning off the main switch, the photographing after the alarm and the release inhibition can be resumed in a simple manner. That is, phototaking can be conducted in the non-data-storing mode even though the EEPROM is FULL (insufficient memory area reining). FIG. 11 shows a camera in accordance with the second and third aspects of the present invention. In FIG. 11, numeral 101 in broken lines denotes a camera, numeral 102 denotes a microcomputer (CPU) for controlling the camera, numeral 103 denotes a manipulation member of the camera, numeral 104 denotes a display device of the camera, numeral 105 denotes a memory and numeral 111 denotes a personal computer which is can communicate with the camera. The personal computer 111 also has a microcomputer (CPU), not shown.

When the photographing data is to be stored, data to be stored may be set while watching a screen of the personal computer.

Figure 12:
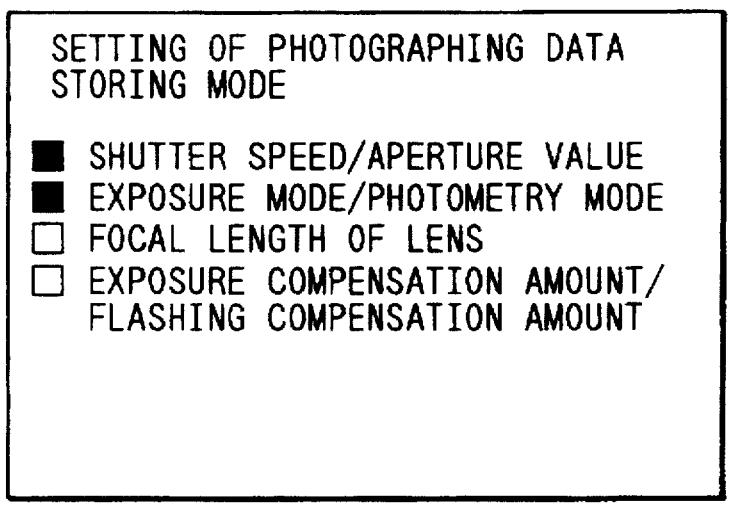
FIG. 12 shows a screen for setting memory items of the photographing data by the personal computer.

FIG. 12 shows an example of the screen of the personal computer. Items such as a shutter speed/diaphragm value, an exposure mode/photometering mode, a lens focal distance, an exposure correction amount/light intensity correction amount are displayed.

The items to be stored are selected by inverting the mark ☐ at the head of each item to the mark ■ and the information is sent to the camera so that it is stored in the memory of the camera.

FIG. 13 shows the setting information of the memory items set by the personal computer. In FIG. 13, the memory item setting information is 1-byte information and bits 0–2 store the number of memory bytes required for one frame. As shown in FIG. 14, the 3-bit information may assume a value of 000-110. The bit 3 of FIG. 13 is the shutter speed/diaphragm value information. If it is "0", it is not stored and if it is "1", it is stored. The bits 4–6 indicate the store/non-store of the exposure mode/photometering mode, the lens focal distance and the exposure correction amount/light intensity correction amount.

FIG. 15 shows the information amount necessary for the respective items. The exposure mode and the photometering mode require 4 bits and others require 1 byte. Accordingly, the exposure mode and the photometering mode may be combined and stored as 1-byte photographing information.

Figure 16:
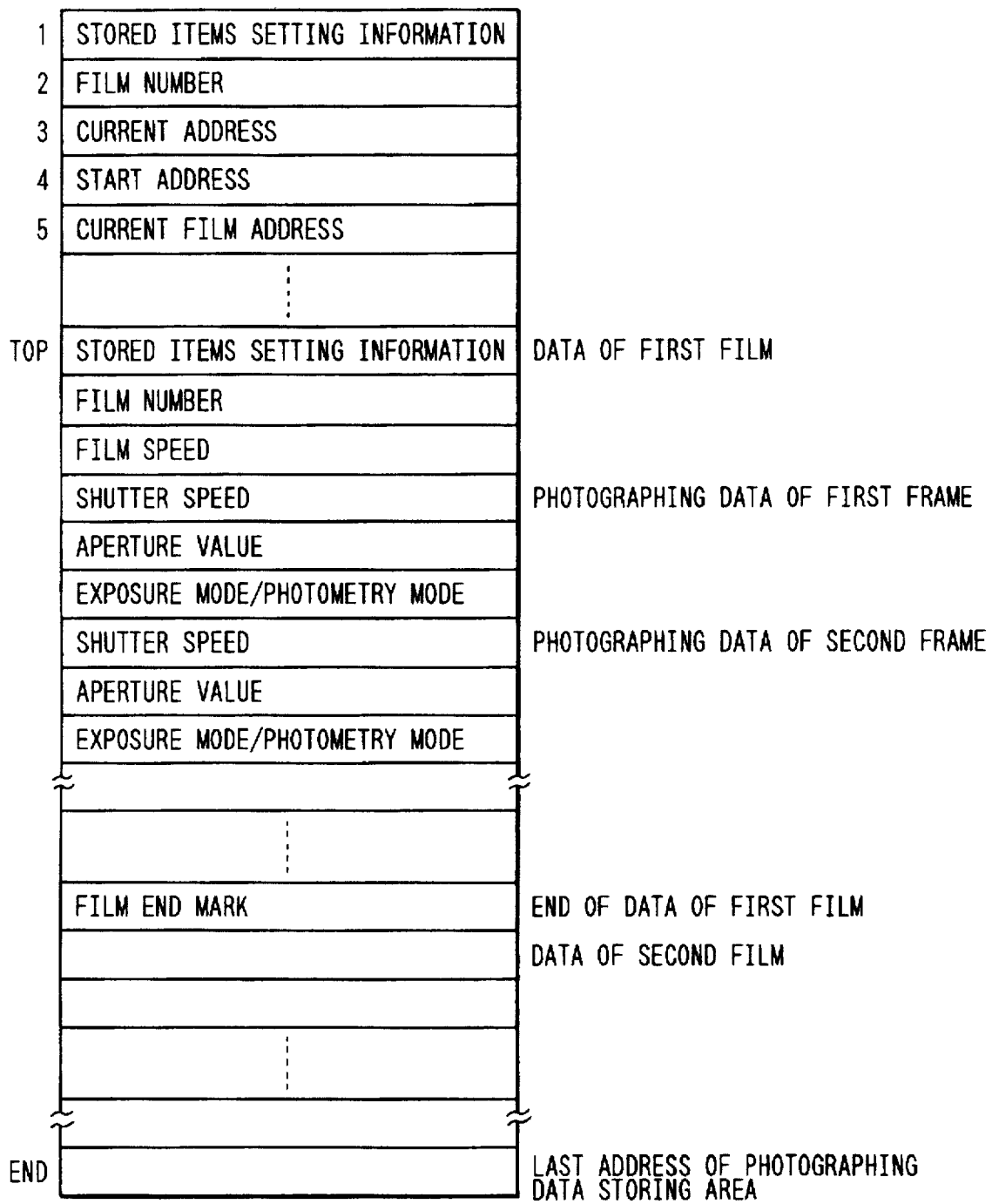
FIG. 16 shows a memory status of the memory device for the photographing data.

FIG. 16 shows a memory of the camera. The memory item setting information is stored at the address <1>. The film number information is stored at the address <2>. This information is incremented each time the film is exchanged. The address information for storing the photographing data into the memory is stored at the addresses <3>–<5>. The current address at the address <3> indicates the address of the memory for the photographing data to be written next and it is incremented by one each time one byte is written. The start address at the address <4> stores the address to start the storing and it is updated when the photographing data is read or erased. The current film address at the address <5> stores the first address of the currently photographed film and it is updated each time the film is exchanged.

The address <TOP> stores the start address at which the actual photographing data is stored and the address <END> stores the end address. Namely, the photographing data is stored in the memory area between TOP and END.

It is assumed that the storing of the photographing data is started while no photographing data is stored.

The memory items are first set by the personal computer. This is done by manipulating a keyboard while watching the screen of FIG. 12. The information is transferred to the camera by the communication means so that the microcomputer 102 of the camera writes the information into the predetermined address, that is, the address <1> of FIG. 16 of the memory 105. Since the contents stored in FIG. 12 are shutter speed/diaphragm and the exposure mode/photometering mode, the bit 3="1", the bit 4="1" and the number of memory bytes is 3 so that they are [1 Dh].

Since it is now in the initial state in which no photographing data has been stored, the address of <TOP> has been written in each of the address information at the addresses <3>–<5> of FIG. 16. When the film is loaded and it is wound up to the first frame, the microcomputer 102 increments the film number at the address <2> by one and writes it into the address designated by the current address at the address <3>, that is, the address <TOP>. Namely, the film number of the first film is written. The content of the address <3> is incremented by one.

When the photographing of the first frame is made, the shutter speed data is written into the address <TOP+1>, the diaphragm value is written into the address <TOP+2> and the exposure mode/photometering mode is written into the address <TOP+3>. When the data of the first frame has been stored, the current address at the address <3> has been changed to <TOP+5>.

Similarly, the data for the second and subsequent frames are stored. When the film is exhausted, the film is rewound. The film end mark which indicates the end of the photographing data of one film is written. The current film address at the address <5> is changed to the start address of the second film. Since the current address indicates the head of the second film, the current address may be copied to the current film address.

When the second film is loaded and wound up to the first frame, the film number of the second film is stored as it is for the first film.

The above operation for the address information is shown below.

Initial State

| Current address | TOP |
|---|---|
| Start address | TOP |
| Current film address | TOP |

At the end of the easy load (idling wind-up) of the first film

| Current address | TOP + 1 |
|---|---|
| Start address | TOP |
| Current film address | TOP |

N-th frame of the first film (the number of memory bytes per frame=M)

| Current address | TOP + 1 + nXM |
|---|---|
| Start address | TOP |
| Current film address | TOP |

At the end of rewinding of the first film (N frames)

| Current address | TOP + 1 + NXM + 1 |
|---|---|
| Start address | TOP |
| Current film address | TOP + 1 + NXM + 1 |

At the end of the easy load (idling wind-up) of the second film

| Current address | (TOP + 1 + NXM + 1) + 1 |
|---|---|
| Start address | TOP |
| Current film ,'address | TOP + 1 + NXM + 1 |

However, the memory capacity of the memory is definite. Namely, in FIG. 16, the area in which the photographing data can be stored is from <TOP> to <END>. Accordingly, it is necessary to always monitor the remaining capacity when the photographing data is stored. Namely, after one frame has been photographed and the photographing data has been stored, whether the memory area to store the number of bytes per frame plus the film end mark remains or not is checked.

In the example of FIG. 16, the end address to store the photographing data is <END>. In the present embodiment, when the photographing data has been stored up to <END>, the next data is stored from <TOP>. Accordingly, the next address to <END> is <TOP>. The content of the address <4> is now <TOP>. Namely, it is <END>+1. Accordingly, the remaining memory capacity is the content of <END+1>- content of <current address>.

Thus, whether the data can no longer be stored or not is determined by comparing;

(the number of memory bytes per frame+the area to write the film end mark)

with (the content of <END+1>-the content of <current address>)

and determining that no more data can be stored if the latter is smaller than the former. Then, the camera may issue an alarm or stop the storing. A memory full bit indicating that the memory is full is set. It is in the bit 7 of FIG. 13. The area to write the film end mark is to be taken into consideration so that a margin to write the film end mark is assured at the time of rewinding if the memory capacity reaches full when the all frames of the film are exhausted.

In the present embodiment, the storing of the photographing data is started from the address <TOP> of the memory although it may be started from any address between <TOP> and <END>. The area to store the start address of the storing is <start address>. A formula to calculate the remaining memory capacity differs depending on the size of the start address and the current address. Where (the content of the start address)>(the content of the current address), (the remaining capacity)=(the content of the start address)-(the content of the current address) bytes, and where (the content of the start address)<(the content of the current address), (the remaining capacity)=(the content of <END>)-(the content of the current address)+(the content of the start address)- (the content of <TOP>) bytes.

An operation of the camera CPU 102 in the photographing operation is now explained with reference to a flow chart.

Figure 17:
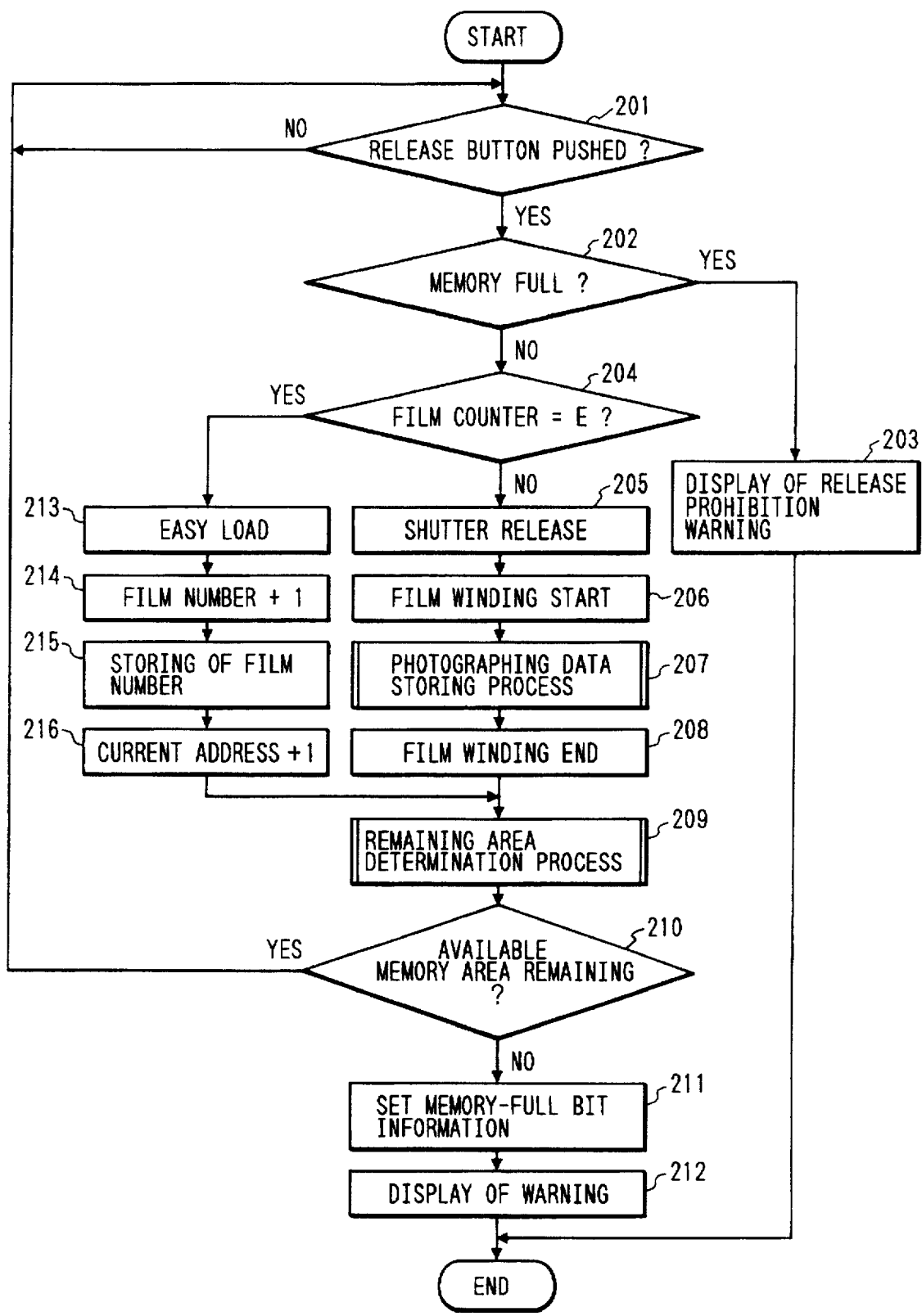
FIG. 17 shows a flow chart of a photographing operation of a CPU of the camera.

FIG. 17 shows a main routine of the operation of the camera CPU 102 in the photographing mode. When a partial depression switch, not shown, is depressed, the flow is started.

In a step 201, whether a release button, not shown, has been depressed or not is determined. If it has been depressed, the process proceeds to a step 202.

In the step 202, whether the memory to store the photographing data has a vacant area or not is determined. If the memory is full (the memory area is short), the process proceeds to a step 203 to display an alarm and inhibit the release operation.

If the memory is not full, the process proceeds to a step 204. In the step 204, whether the film counter is "E" or not is checked. If the film counter indicates "E", it means that the film is in an unexposed state. If the film counter is other than "E", the process proceeds to a step 205 to release the shutter.

When the release operation is completed, the process proceeds to a step 206 to start the wind-up of the film.

In a step 207, the photographing data is stored in the memory.

In a step 208, the one-frame wind-up is detected and the wind-up is terminated.

In a step 209, the remaining memory capacity is calculated and in a step 210, the presence or absence of the remaining capacity is checked.

If the remaining capacity is less than a predetermined capacity, the process proceeds to a step 211 to store the information, and in a step 212, an alarm is displayed.

In the step 209, the process proceeds to a remaining capacity determination sub-routine to be described later.

In the step 210, the remaining capacity determination sub-routine is executed and if the remaining memory capacity is larger than the predetermined capacity (to be described in FIG. 21), the process returns to the release signal discrimination routine of the step 201.

In the step 204, if the content of the film counter is "E", the process proceeds to a step 213 to carry out the easy load.

When the easy load is completed, the film number is incremented by one in a step 214 and it is started at the address of the memory designated by the current address in a step 215.

In a step 216, the current address is incremented by one.

The process then proceeds to the step 209 to determine the remaining memory capacity. The process of the steps 207 and 209 will be described in detail later.

Figure 18:
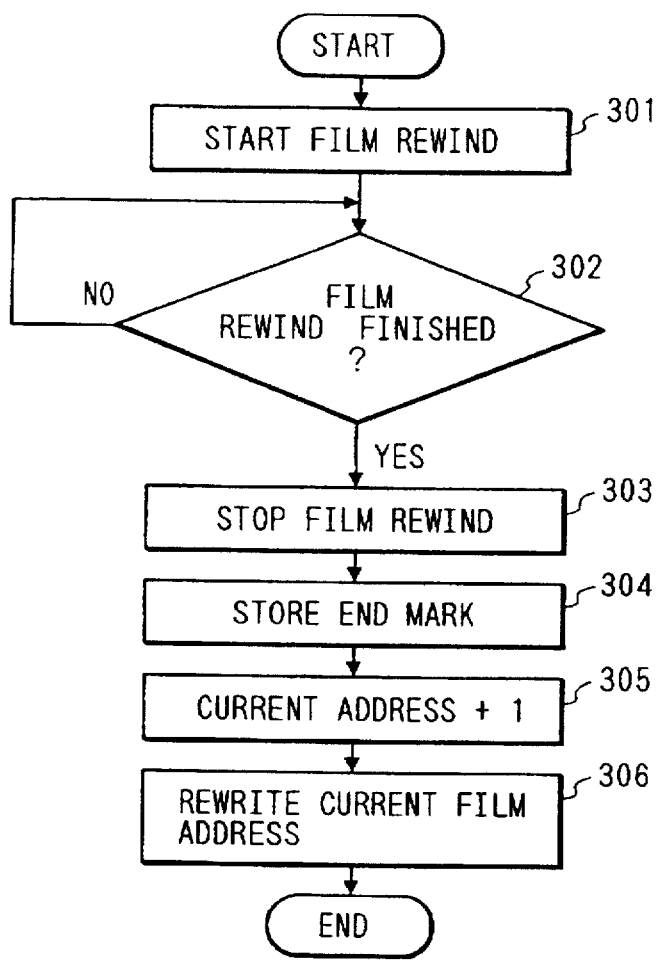
FIG. 18 shows a flow chart of a rewind operation of the CPU of the camera.

An operation of the camera CPU 102 in the rewind mode is now explained with reference to a flow chart of FIG. 18. This flow is started when a film rewind button, not shown, is manipulated and a rewind switch linked thereto is turned on.

In a step 301, a motor, not shown, is driven to start the rewinding of the film.

In a step 302, the end of the rewinding is detected and if the rewinding is over, the motor is stopped in a step 303.

In a step 304, an end mark which indicates the end of the photographing data of one film is stored at the address designated by the current address.

Figure 19:
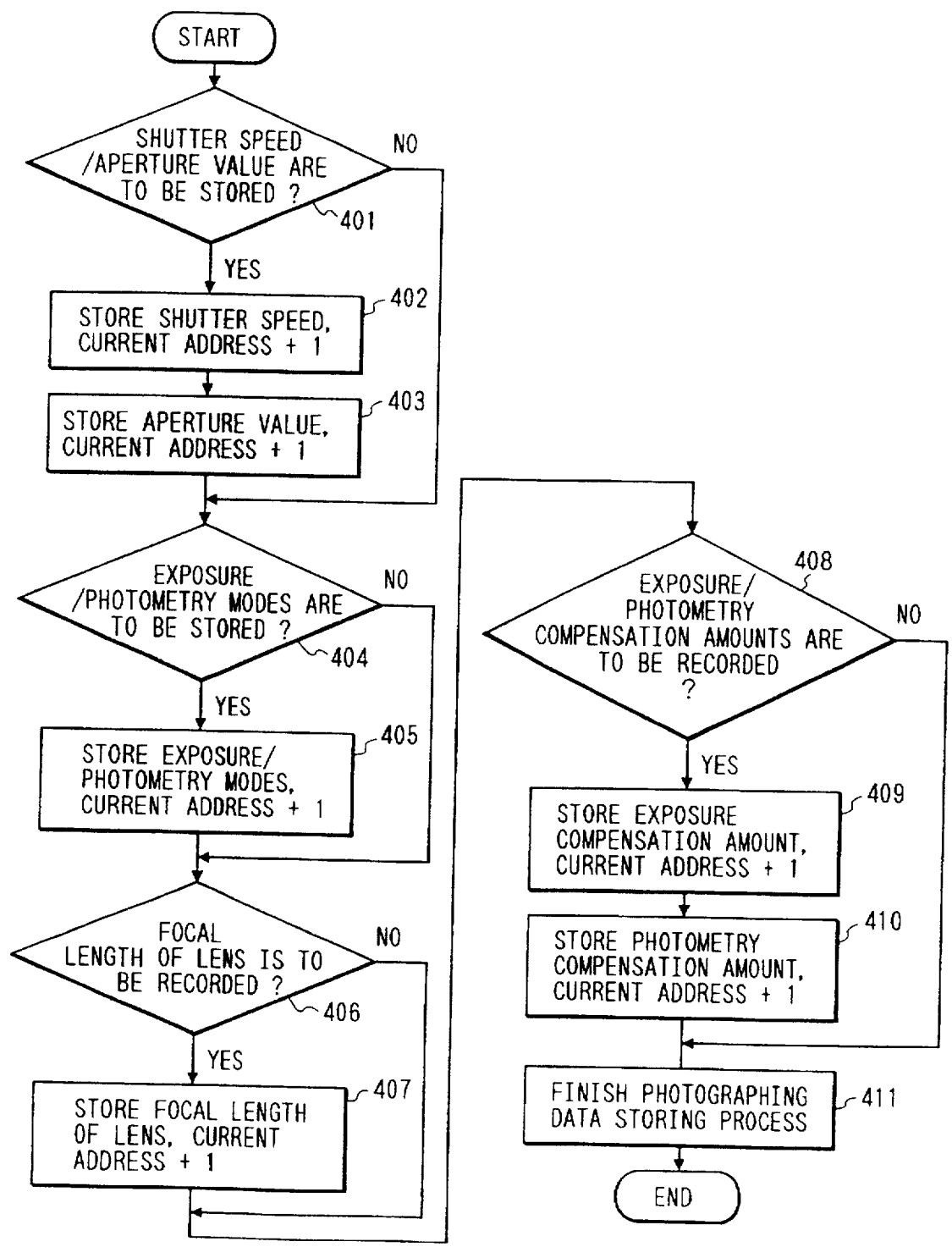
FIG. 19 shows a sub-routine of a photographing data storing process by the CPU of the camera.

In a step 305, the current address is incremented by one and in a step 306, the content of the current film address is changed to the content of the current address. The current film address indicates the memory start address of the photographing data of the next A photographing data storing sub-routine in the step 207 of FIG. 17 is now explained with reference to FIGS. 19 and 20. In this process, the data is stored while the memory item setting information (FIG. 13) is checked.

In a step 401, if the setting is to the shutter speed/ diaphragm value, the shutter speed is stored in a step 402 and the current address is incremented by one, and in a step 403, the diaphragm value is stored and the current address is incremented by one.

In a step 404, if the setting is to the photometering mode/exposure mode, the 4-bit photometering mode data and the 4-bit exposure mode data are stored as 1-byte data in a step 405 and the current address is incremented by one.

In a step 406, if the setting is to the lens focal distance storing, the lens focal distance is stored in a step 407 and the current address is incremented by one.

In a step 408, if the setting is to the exposure/light intensity correction amount storing, the exposure correction amount is stored in a step 409 and the current address is incremented by one, and the light intensity correction amount is stored in a step 410 and the current address is incremented by one. Then, the process proceeds to a step 411 to terminate the storing of the photographing data.

If non-storing is set in the step 401, 404, 406 or 408, the process proceeds to the step 404, 406, 408 or 411, respectively.

Figure 20:
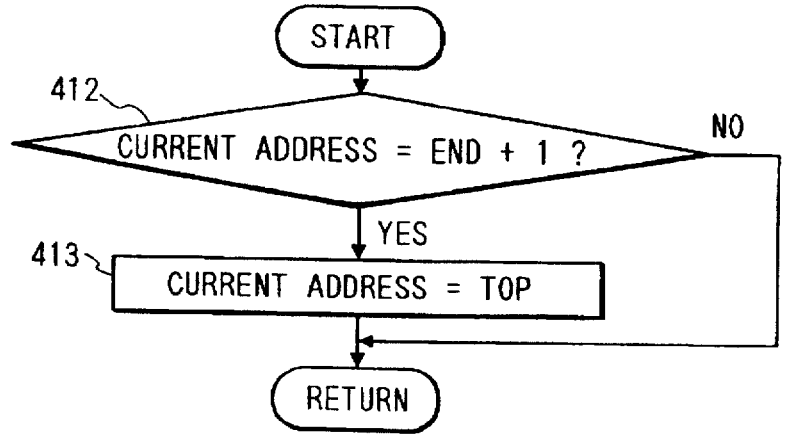
FIG. 20 shows a sub-routine of the photographing data storing process by the CPU of the camera.

If the result of the increment of the current address after the string of the photographing data in the step 402, 403, 405, 407, 409 or 410 exceeds the <END>, the content of the current address is changed to <TOP>. Steps 412 and 413 of FIG. 20 show this process.

The remaining memory capacity determination sub-routine in the step 209 of FIG. 17 is explained with reference to FIG. 21.

Figure 21:
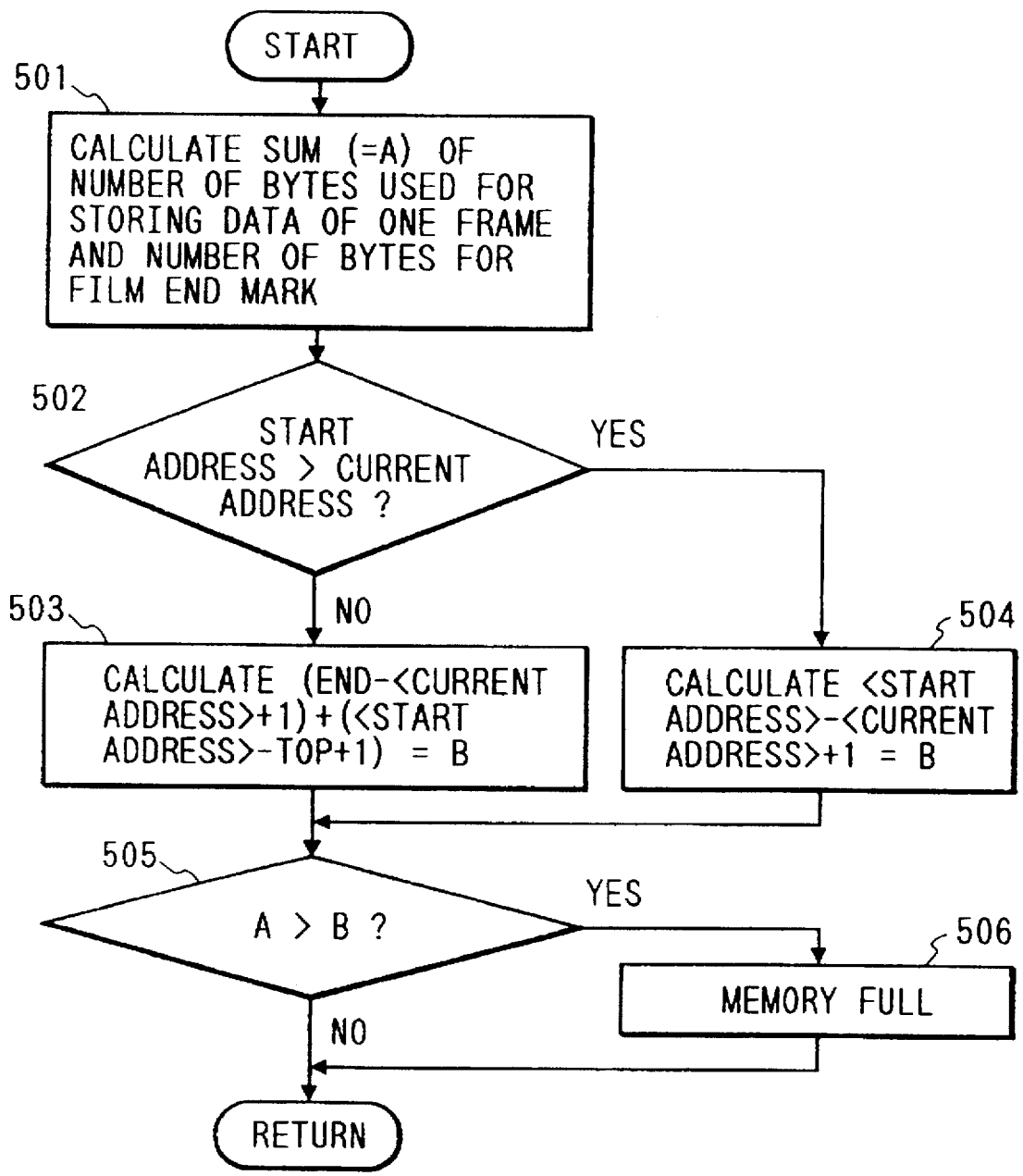
FIG. 21 shows a sub-routine of determining a remaining memory capacity by the CPU of the camera.

In FIG. 21, a sum of the number of memory bytes per frame (FIG. 14) and the number of bytes of the film end mark is calculated in a step 501 and it is represented by A.

In a step 502, the content of the start address and the content of the current address are compared. If (the start address)>(the current address) is not met, the process proceeds to a step 503, and if it is met, the process proceeds to a step 504.

In the step 503, the data in the frame is calculated and the result is represented by B. In the step 504, the data in the frame is calculated and the result is represented by B.

In a step 505, the values A and B are compared, and if A>B is met, it is determined that the memory is full and the flow is returned and the process proceeds to the step 211 of FIG. 17 through the step 210, and if A>B is not met, the flow is returned and the process returns to the step 201 through the step 210.

The reading of the photographing data stored in the camera is now explained for the case where the camera and the personal computer are connected as shown in FIG. 11 to read the photographing data.

It is assumed that the second film is ready to be photographed as shown in FIG. 16. The photographing of the first film has been completed. The photographing data is read by the operation of the personal computer. The personal computer first checks the address information. It makes the following decision and reads the photographing data. The data actually read is the photographing data of the photographed film (that is, the photographing data of the first film) and the photographing data of the film in the course of photographing is not read.

The reading of the photographing data is done by the following three decisions:

1. When (the content of the current film address)>(the content of the start address), (the read start address)=(the start address)

(the read end address)=(the current film address)−1

2. When (the content of the current film address)<(the content of the start address), (the read start address)=(the start address)

(the read interrupt address)=END (the read resume address)=TOP (the read end address)=(the current film address)−1

3. When (the content of the current film address)=(the content of the start address), When the memory full bit="1", (the read start address)=(the start address)

(the read end address)=(the current film address)−1

When the memory full bit="0", no photographing data has been stored.

After the photographing data is read, the personal computer updates the address information so that the storing of the photographing data may be instantly resumed by reading the photographing data after the memory full state appears during the photographing. The address information is updated in the following process.

<Change the content of the start address to the content of the current address existing immediately before the reading>
<Clear the memory full bit>

When the photographing data is read by the above steps, the storing of new photographing data is permitted. Namely, by merely updating the content of the start address with the content of the current film address, the same effect as that of erasing the stored photographing data is attained.

In FIG. 16, the photographing data is stored starting from <TOP>. However, in practice, the data is stored from <TOP> when the address reaches <END>, so the memory can always be used effectively.

Figure 22:
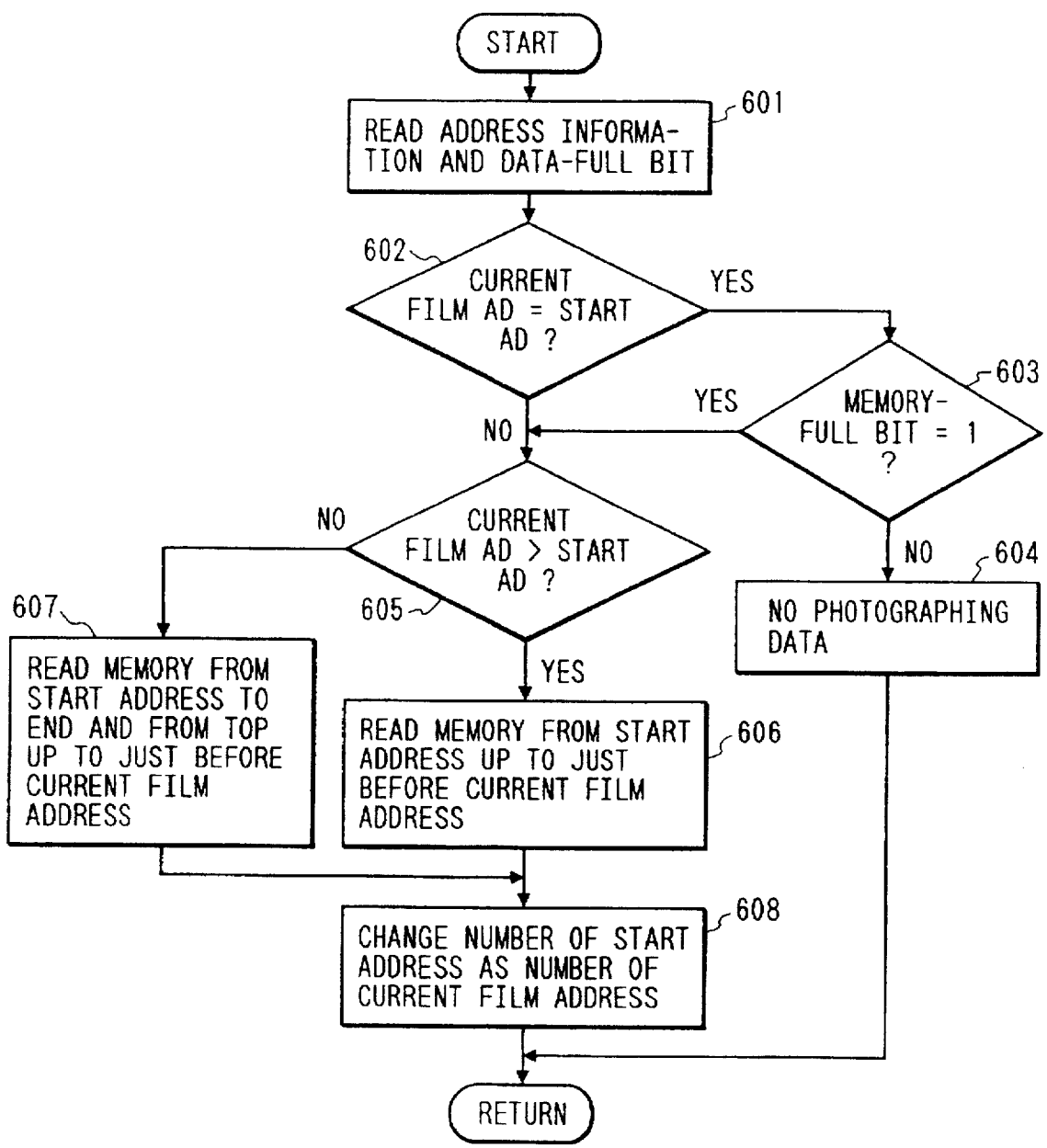
FIG. 22 shows a flow chart of an operation of the CPU of the personal computer in reading the photographing data.

An operation of the CPU, not shown, in the personal computer in reading the photographing data is now explained with reference to a flow chart of FIG. 22.

This flow is started when a manipulation member (not shown) for reading by the personal computer connected to the camera is manipulated.

In a step 601, the address information and the memory full bit are read.

In a step 602, the content of the current film address and the content of the start address are compared, and if they are equal, the process proceeds to a step 603.

In the step 603, the memory full bit is checked. If it is "1" (memory full), the process proceeds to a step 605.

If the memory full bit is "0", the process proceeds to a step 604 to indicate there is no stored photographing data.

In the step 605, the content of the current film address and the content of the start address are compared. If the content of the current film address is larger than the content of the start address, the process proceeds to a step 606, and if it is smaller, the process proceeds to a step 607.

In the steps 606 and 607, the photographing data from the camera is read in different manner to each other. After the photographing data is read in the steps 606 and 607, the content of the current film address is written into the start address in a step 608. As a result, the read photographing data is erased.

FIG. 23 shows an example of display of the photographing data read by the personal computer. The film number and the film sensitivity are displayed as the common items and the shutter speed/diaphragm value and the exposure mode/photometering mode are displayed as the frame unique data. In the present embodiment, since the lens focal distance, the exposure correction amount and the light intensity correction amount are not selected, they are not displayed. In order to display the photographing data by the personal computer, the display items are determined by the memory item setting information. The data read from the camera has no delimiter for each frame as shown in FIG. 16. Accordingly, in order to correctly display the photographing data, it is necessary to determine the stored items of the photographing data. In the photographing data shown in FIG. 16, since the memory item setting information is also stored, the personal computer may determine the stored items and the number of memory bytes per frame. In the present embodiment, the bytes 1–3 of the photographing data of one film are the common items, the first byte is for the memory item setting information, the second byte is for the film number and the third byte is for the film sensitivity, and the bytes 4–6 are for the photographing data of the first frame, and the bytes 7–9 are for the photographing data of the second frame.

If the memory items are changed in the course of photographing, the photographing data is not correctly displayed for the following reasons.

1) Only one memory item setting information is stored for one film.

2) If the memory items are changed even without changing the number of memory bytes per frame, they are not correctly displayed because the data formats are different.

In the present invention, the setting of the memory items in the course of photographing is inhibited to prevent the above problem. Specifically, when the memory mode setting is to be modified by the personal computer, the updating of the memory item setting information may be inhibited if the camera stores the current photographing data. The screen of FIG. 2 is displayed by the personal computer, the memory items are changed, and when the information is transferred to the camera, the information on the number of photographed frames of the camera is read by the communication between the personal computer and the camera. Unless the frame number information is E (empty), it is determined that the film is loaded in the camera.

Thus, when the content of the film counter is other than E (empty), the personal computer displays a message as shown in FIG. 24 and inhibits the updating of the memory item setting information of the camera.

Figure 25:
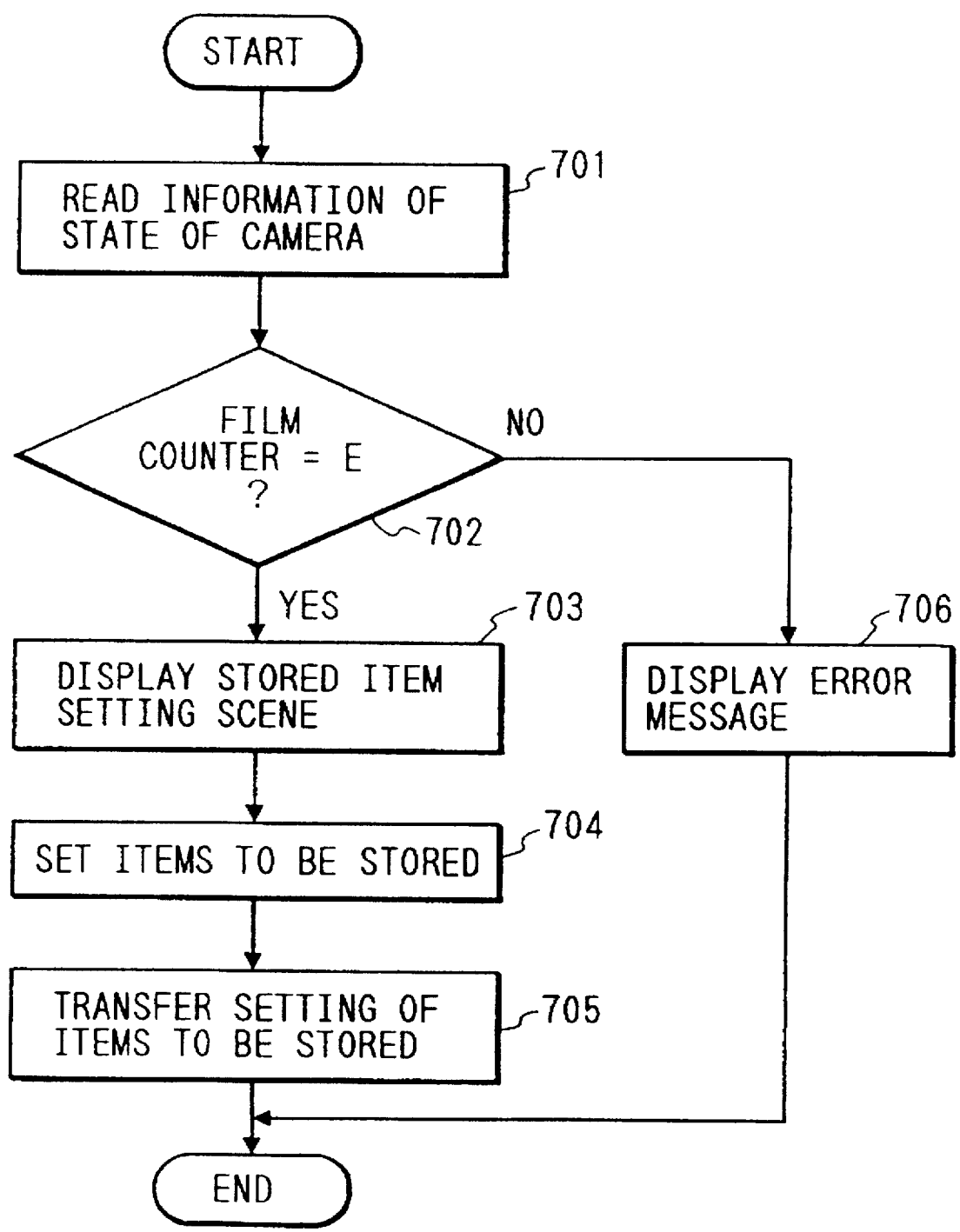
FIG. 25 shows a flow chart of a setting operation of a memory mode by the CPU of the personal computer.

An operation of the CPU (not shown) of the personal computer 111 in the setting of the memory mode is now explained with reference to a flow chart of FIG. 25. In the present embodiment, the memory mode is set by the personal computer although it may be done by the camera if the camera CPU 2 can perform the operation of the flow of FIG. 25.

When the memory mode is set by the personal computer, the flow is started.

In a step 701, the communication is made with the camera to read the status of the camera.

In a step 702, whether the content of the film counter of the camera is "E" or not is determined. If it is "E", the process proceeds to a step 703 to display the setting screen of the photographing data memory mode.

The memory items are set by a keyboard (not shown) while watching the screen (step 704) and they are transferred to the camera (step 705) so that the memory item setting information shown in FIG. 13 is stored at the address <1> of FIG. 16.

In a step 702, when the content of the film counter of the camera is other than "E", it is determined that the film under photographing is loaded in the camera and in a step 706, an error message shown in FIG. 24 is displayed.

Figure 26:
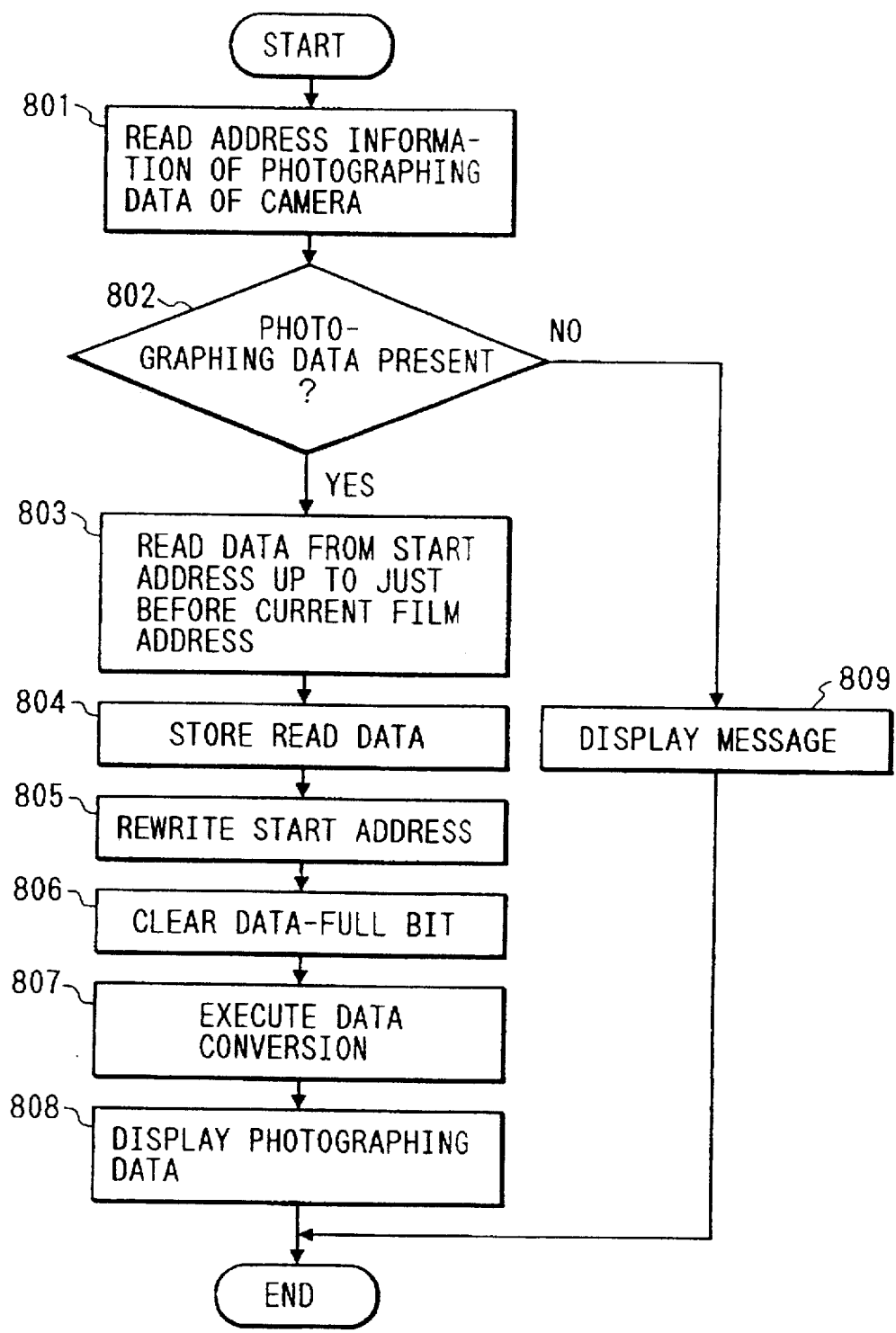
FIG. 26 shows a flow chart of a read/display operation of the photographing data by the CPU of the personal computer.

The read/display operation of the photographing data is now explained with reference to the flow chart of FIG. 26.

When the photographing data is read and displayed by the personal computer, the address information of the photographing data of the camera is read in a step 801.

In a step 802, the address information is checked. If it is determined that there is no stored photographing data, the process proceeds to a step 809 to display the message "No photographing data."

If the decision is that there is photographing data, the photographing data is read from the camera based on the address information, and in a step 804, the read photographing data is stored in the memory (memory, floppy disk, IC card) of the personal computer.

In a step 805, the start address is updated to erase the photographing data in the camera which has been read, and in a step 806, the memory full bit is cleared and the process proceeds to a step 807.

In the step 807, the data such as the shutter speed and the diaphragm value are converted based on the memory item setting information of the stored photographing data and they are displayed as shown in FIG. 23 in a step 808.

In accordance with the present embodiment, since the photographing data can be stored, read and erased by merely processing the address information, the photographing data can be processed with a simple process. Since the memory is used without waste, the efficient storing of the photographing data is attained.

Further, since the memory item information is displayed together with the photographing data stored in the camera, a correct image data can always be displayed.

What is claimed is:

1. A camera capable of optically recording images on a photosensitive medium loaded therein, and comprising:

a first recording medium, other than the photosensitive medium, which stores photographing data determined for individual photographs at the time of photographing;

a second recording medium, other than the photosensitive medium, which stores mode information indicating whether storing of the photographing data is to be effected;

a remaining memory capacity detector which outputs a first signal when a sufficient memory area to store the photographing data for a photograph is present in said first recording medium, and which outputs a second signal when there is not a sufficient memory area remaining;

a warning device which effects a warning when said second signal is outputted; and a main switch, wherein the mode information stored in said second recording medium is resettable by turning off said main switch.

2. A camera according to claim 1, wherein said warning device includes a display which displays a warning.

3. A camera according to claim 1, wherein said first and second recording media are electrical recording media.

4. A camera capable of optically recording images on a photosensitive medium loaded therein, and comprising:

a first recording medium, other than the photosensitive medium, which stores photographing data determined for individual photographs at the time of photographing;

a second recording medium, other than the photosensitive medium, which stores mode information indicating whether storing of the photographing data is to be effected;

a remaining memory capacity detector which outputs a first signal when a sufficient memory area to store the photographing data for a photograph is present in said first recording medium, and which outputs a second signal when there is not a sufficient memory area remaining;

a release inhibit device which inhibits a release operation when said second signal is outputted; and a main switch, wherein the mode information stored in said second recording medium is resettable by turning off said main switch.

5. A camera according to claim 4, wherein said first and second recording media are electrical recording media.

6. A camera capable of optically recording images on a photosensitive medium loaded therein, and comprising:

a memory, other than the photosensitive medium, which stores photographing data determined for individual photographs at the time of photographing;

a remaining memory capacity detector which outputs a first signal when a sufficient memory area to store the photographing data for a photograph is present in said memory, and which outputs a second signal when there is not a sufficient memory area remaining;

a warning device which effects a warning when said second signal is outputted; and a portion which enables phototaking in a non-data-storing mode when there is not a sufficient memory area remaining.

7. A camera according to claim 6, wherein said warning device includes a display which displays a warning.

8. A camera according to claim 6, wherein said memory is electrical.

9. A camera capable of optically recording images on a photosensitive medium loaded therein, and comprising:
- a memory, other than the photosensitive medium, which stores photographing data determined for individual photographs at the time of photographing;
- a remaining memory capacity detector which outputs a first signal when a sufficient memory area to store the photographing data for a photograph is present in said memory, and which outputs a second signal when there is not a sufficient memory area remaining;
- a release inhibit device which inhibits a release operation when said second signal is outputted; and
- a portion which enables phototaking in a non-data-storing mode when there is not a sufficient memory area remaining.

10. A camera according to claim 9, wherein said memory is electrical.

* * * * *